US012152374B2

(12) United States Patent
Udagawa et al.

(10) Patent No.: US 12,152,374 B2
(45) Date of Patent: Nov. 26, 2024

(54) CONSTRUCTION MACHINE

(71) Applicant: HITACHI CONSTRUCTION MACHINERY CO., LTD., Tokyo (JP)

(72) Inventors: Tsutomu Udagawa, Tsukuba (JP); Junji Yamamoto, Tsukuba (JP); Shigeyuki Sakurai, Kasumigaura (JP); Yukihito Suzuki, Tsukuba (JP); Hidenobu Tsukada, Ushiku (JP); Atsushi Kanda, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 940 days.

(21) Appl. No.: 17/264,324

(22) PCT Filed: Apr. 18, 2019

(86) PCT No.: PCT/JP2019/016724
§ 371 (c)(1),
(2) Date: Jan. 29, 2021

(87) PCT Pub. No.: WO2020/066098
PCT Pub. Date: Apr. 2, 2020

(65) Prior Publication Data

US 2021/0301502 A1 Sep. 30, 2021

(30) Foreign Application Priority Data

Sep. 26, 2018 (JP) ................................ 2018-181055

(51) Int. Cl.
*E02F 9/26* (2006.01)
*E02F 3/32* (2006.01)
(Continued)

(52) U.S. Cl.
CPC ............ *E02F 9/267* (2013.01); *E02F 9/2004* (2013.01); *E02F 9/2066* (2013.01);
(Continued)

(58) Field of Classification Search
CPC ....... E02F 9/267; E02F 9/2004; E02F 9/2066; E02F 9/2235; E02F 9/226; E02F 9/2296;
(Continued)

(56) References Cited

U.S. PATENT DOCUMENTS 6,183,210 B1 2/2001 Nakamura
2010/0161175 A1* 6/2010 Yamada .................. F02D 41/22
701/33.4

(Continued)

FOREIGN PATENT DOCUMENTS

CN 106133252 B * 3/2019 ............ E02F 9/2066
EP 2112494 A1 * 10/2009 ................ E02F 9/26

(Continued)

OTHER PUBLICATIONS

English translation of JP 2016169818, Sep. 2016. (Year: 2016).*

(Continued)

*Primary Examiner* — Michael P Nghiem
(74) *Attorney, Agent, or Firm* — MATTINGLY & MALUR, PC

(57) ABSTRACT

A cost required to perform the diagnosis of the degradation such as a reduction in output power of an engine while engine degradation diagnosis accuracy is improved. To this end, a controller 37 (engine diagnosing device) determines whether a hydraulic pump 12 is in a preset loaded state (an operation scene where a load torque of the hydraulic pump 12 is in a stable state) for acquiring diagnosis data of an engine 10, and validates a controlled variable related to a torque command value Ta of speed sensing control as the diagnosis data of the engine 10 when it is determined that the hydraulic pump 12 is in the present loaded state, generates time history data using this validated controlled variable as
(Continued)

a current feature variable, and enables this time history data to be displayed as trend data for engine diagnosis on a display device 38.

7 Claims, 18 Drawing Sheets

(51) Int. Cl.

| | |
|---|---|
| ***E02F 3/42*** | (2006.01) |
| ***E02F 9/20*** | (2006.01) |
| ***E02F 9/22*** | (2006.01) |
| ***F02B 63/06*** | (2006.01) |
| ***F02D 29/04*** | (2006.01) |
| ***F04B 49/12*** | (2006.01) |
| ***F15B 15/18*** | (2006.01) |
| ***G07C 5/08*** | (2006.01) |

(52) U.S. Cl.
CPC ............ *E02F 9/2235* (2013.01); *E02F 9/226* (2013.01); *E02F 9/2296* (2013.01); *F02B 63/06* (2013.01); *F02D 29/04* (2013.01); *F04B 49/12* (2013.01); *F15B 15/18* (2013.01); *G07C 5/0808* (2013.01); *G07C 5/0825* (2013.01); *E02F 3/32* (2013.01); *E02F 3/425* (2013.01); *E02F 9/2267* (2013.01); *E02F 9/2271* (2013.01); *E02F 9/2285* (2013.01); *F02D 2200/101* (2013.01)

(58) Field of Classification Search
CPC . E02F 3/32; E02F 3/425; E02F 9/2267; E02F 9/2271; E02F 9/2285; F02B 63/06; F02D 29/04; F02D 2200/101; F04B 49/12; F15B 15/18; G07C 5/0808; G07C 5/0825
USPC .......................................................... 702/183
See application file for complete search history.

(56) References Cited

U.S. PATENT DOCUMENTS

| | | | | |
|---|---|---|---|---|
| 2014/0020375 | A1 | 1/2014 | Fujishima et al. | |
| 2019/0024342 | A1* | 1/2019 | Yoshida | B60W 20/17 |

FOREIGN PATENT DOCUMENTS

| | | | | | |
|---|---|---|---|---|---|
| JP | 2-115582 | A | | 4/1990 | |
| JP | H02115582 | A | * | 4/1990 | |
| JP | 11-101183 | A | | 4/1999 | |
| JP | 2000-073812 | A | | 3/2000 | |
| JP | 2000-073960 | A | | 3/2000 | |
| JP | 2005180259 | A | * | 7/2005 | |
| JP | 2005226493 | A | * | 8/2005 | |
| JP | 4853921 | B2 | | 1/2012 | |
| JP | 2016169818 | A | * | 9/2016 | E02F 9/22 |
| KR | 10-2014-0039198 | A | | 4/2014 | |

OTHER PUBLICATIONS

English translation of CN 106133252, Mar. 2019. (Year: 2019).*
English translation of JP 2005226493, 2005. (Year: 2005).*
English translation of JP 2005180259, 2005. (Year: 2005).*
English translation of H0211558, Apr. 27, 1990. (Year: 1990).*
International Preliminary Report on Patentability received in corresponding International Application No. PCT/JP2019/016724 dated Apr. 8, 2021.
Chinese Office Action received in corresponding Application No. 201980044285.X dated Dec. 3, 2021.
International Search Report of PCT/JP2019/016724 dated Jul. 16, 2019.
Korean Office Action received in corresponding Korean Application No. 10-2020-7038014 dated Jun. 20, 2022.

* cited by examiner

CONSTRUCTION MACHINE

TECHNICAL FIELD

The present invention relates to a construction machine, such as a hydraulic excavator and a crane, equipped with an engine diagnosing device.

BACKGROUND ART

In a construction machine such as a hydraulic excavator and a crane, a diesel engine (hereinafter, simply referred to as "engine") is normally used as a power source of a hydraulic drive system. An abnormality in this engine leads to a reduction in output power of the engine and has a great influence such as a reduction in a performance of the construction machine and occurrence of constraints on operations; thus, it is required to detect an abnormality and ensure prevention and maintenance. In these circumstances, various engine diagnosing technologies have been conventionally proposed.

As one of the engine diagnosing technologies, there is known, for example, a technology described in Japanese Patent No. 4853921.

According to this conventional technology, a machine body management controller collects frequency distribution information representing a relation between a signal intensity related to engine output power and an occurrence frequency whenever the machine body is actuated for a predetermined time and transmits those pieces of data to an accumulation server by a wireless communication function, and the accumulation server stores therein the data. A decrease in the output power of an engine is detected by arranging a plurality of pieces of accumulated frequency distribution information in time series and comparing the information, and the decrease in the engine output power is determined.

According to this conventional technology, it is possible to confirm the intensity of the output power of the engine and the occurrence frequency information over a long period of time; thus, it is possible to confirm the decrease in the output power and the like over time per machine body, and to grasp a degradation situation of the engine.

PRIOR ART DOCUMENTS

Patent Documents

Patent Document 1: Japanese Patent No. 4853921

SUMMARY OF THE INVENTION

Problem to be Solved by the Invention

According to the engine diagnosing technology described in Patent Document 1, the intensity corresponding to the engine output power and the frequency information are accumulated over a given period of time and the plurality of pieces of the frequency information are compared in time series; thus, it is unnecessary to prepare thresholds for determination and it is possible to determine a degree of degradation of the engine by a degree of change in a feature variable only for the machine body. However, a load actually acting on a work device depends on a content of work; thus, strictly speaking, a difference in output power is affected by a difference in a work load. In particular, even if trying to observe an aging degradation, the contents of work over a long period of time differ in a work site and the like and are expected to naturally differ in the work load. In such a case, a tendency of the engine output power is affected by the work site; therefore, it is considered that the tendency is not purely reflective of the performance of the engine and feature variable for determination includes large uncertainty (errors) although the tendency can be somewhat evaluated as a statistical tendency.

Moreover, the necessity of the long-term frequency information makes necessary a large volume of data, a memory area for computing processing, and also a cost for computing (a sophisticated controller). According to Patent Document 1, not a machine-mounted controller but the accumulation server or the like is used via remote communication for the purpose of cost containment. However, this is a configuration adopted to constrain a cost of the machine-mounted controller, which can be said as a supportive background factor that to-be-processed data is enormous and it is difficult to cope with the data by a current machine-mounted controller at a machine-mounted controller technology level and a control technology levels to date. Moreover, it is possible for the accumulation server to handle a huge volume of data; however, a communication cost for transfer of the large volume of data from the machine body is additionally required, and a cost for achieving a diagnosis control logic is generated again in this case.

The present invention has been made in view of such situations, and an object of the present invention is to provide a construction machine in which a cost required to perform diagnosis of a degradation such as a reduction in output power of an engine is reduced while engine degradation diagnosis accuracy is improved.

Means for Solving the Problems

To attain the object, the present invention provides a construction machine comprising: an engine; a hydraulic system including a variable displacement hydraulic pump driven by the engine, a hydraulic actuator driven by a delivery fluid of the hydraulic pump, and a regulator that controls a displacement volume of the hydraulic pump in such a manner that an input torque of the hydraulic pump does not exceed a maximum absorption torque; a controller that computes a torque command value of speed sensing control for controlling the regulator in such a manner that the maximum absorption torque of the hydraulic pump decreases as a load torque of the hydraulic pump increases and a rotation speed of the engine decreases; and an engine diagnosing device that diagnoses the engine, wherein the engine diagnosing device includes the controller, and wherein the controller is configured to: determine whether the hydraulic pump is in a preset loaded state for acquiring diagnosis data of the engine, validate a controlled variable related to a torque command value of the speed sensing control as the diagnosis data of the engine when it is determined that the hydraulic pump is in the preset loaded state, and generate time history data using the validated controlled variable as a current feature variable, and enables the time history data to be displayed as trend data for engine diagnosis on a display device.

In this way, since the controller determines whether the hydraulic pump is in the preset loaded state for acquiring diagnosis data of the engine, validate a controlled variable related to a torque command value of the speed sensing control as the diagnosis data of the engine when it is determined that the hydraulic pump is in the preset loaded state, and enables the time history data to be displayed as trend data for engine diagnosis on a display device, it is possible to greatly reduce a volume of data captured into the controller as the diagnosis data of the engine, and to suppress a cost required to perform the diagnosis of the degradation such as the reduction in the output power of the engine.

Furthermore, by validating the controlled variable related to the torque command value of the speed sensing control when the hydraulic pump is in the preset loaded state as the diagnosis data of the engine, and generating the time history data for the engine diagnosis, it is possible to suppress diagnosis noise based on a measurement error or the like, accurately grasp a situation of the reduction in the output power of the engine, and improve engine degradation diagnosis accuracy.

Advantages of the Invention

According to the present invention, it is possible to improve the engine degradation diagnosis accuracy while suppressing the cost required to perform diagnosis of the degradation such as the reduction in the output power of the engine.

MODES FOR CARRYING OUT THE INVENTION

Embodiments of the present invention will be described hereinafter with reference to the drawings.

First Embodiment

Figure 1:
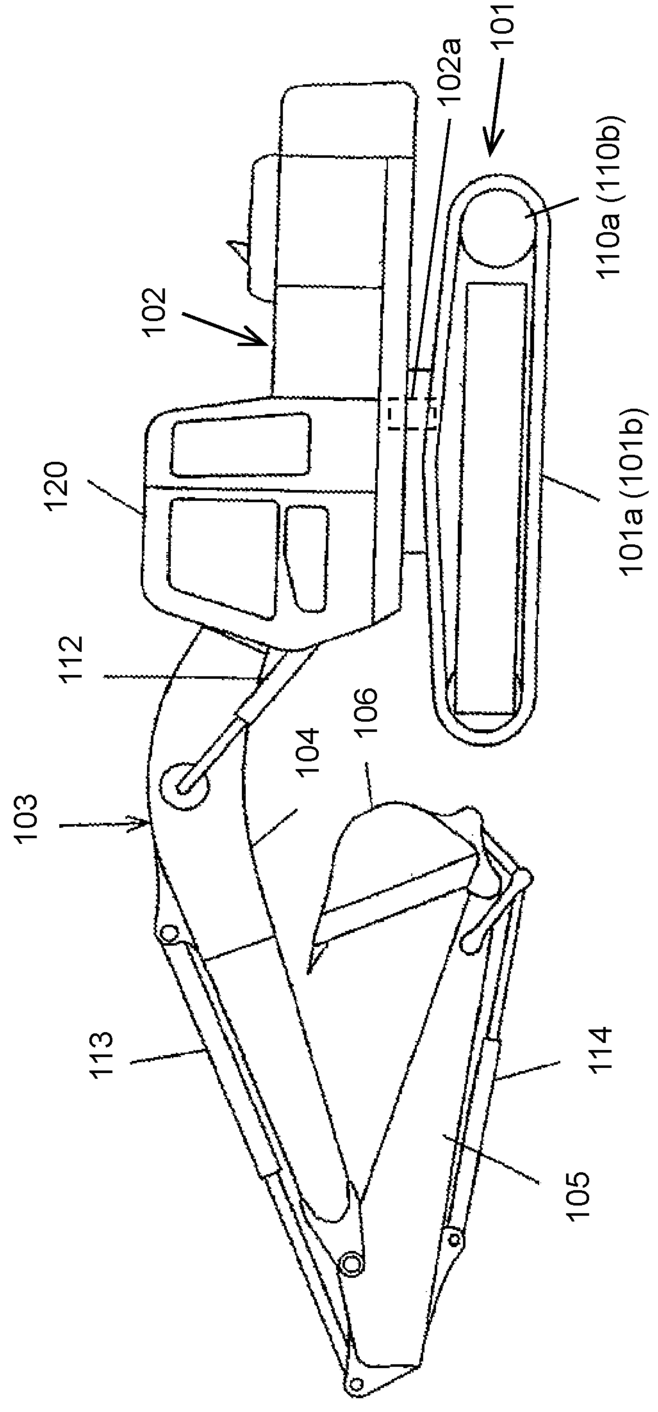
FIG. 1 is a diagram depicting a hydraulic excavator that is a representative example of a construction machine according to the present invention.

FIG. 1 is a diagram depicting a hydraulic excavator that is a representative example of a construction machine according to the present invention.

The hydraulic excavator includes a travel structure 101, a swing structure 102 disposed on the travel structure 101, and a front work device attached to the swing structure 102, that is, a work device 103.

The travel structure 101 has a pair of left and right crawlers 101*a* and 101*b* (only one of which is depicted in FIG. 1), and the crawlers 101*a* and 101*b* are driven by travel motors 110*a* and 110*b* (only one of which is depicted), respectively and travel. The swing structure 102 is driven by a swing motor 102*a* and swings on the travel structure 101.

The work device 103 is configured with a boom 104 attached to the swing structure 102 vertically rotatably, an arm 105 attached to the boom 104 rotatably, and a bucket 106 attached to the arm 105 rotatably. The boom 104 is driven by a boom cylinder 112, the arm is driven by an arm cylinder 113, and the bucket 106 is driven by a bucket cylinder 114. A cabin 120 including an operation room is provided in a front side position on the swing structure 102.

Figure 2:
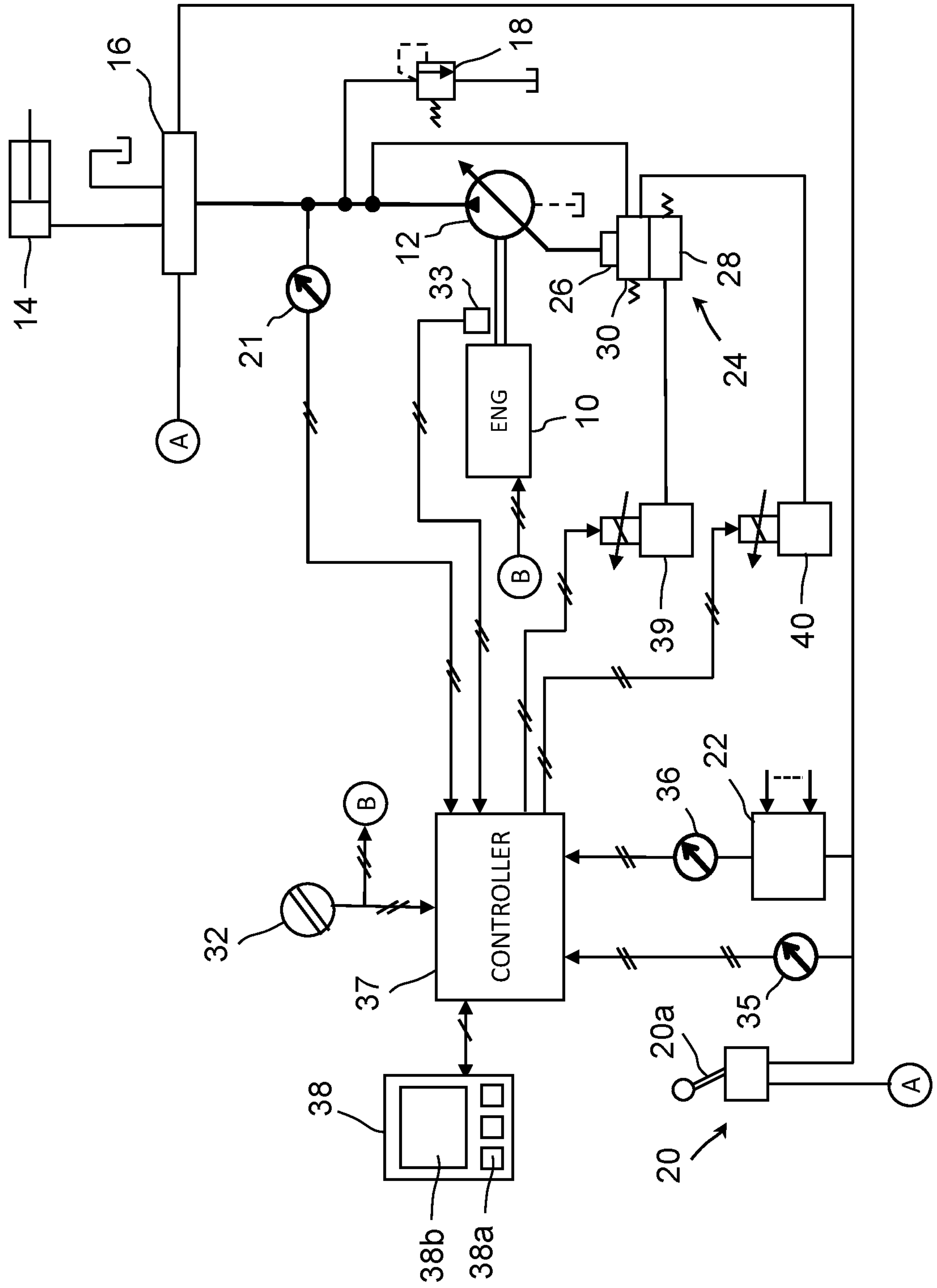
FIG. 2 is a diagram depicting a hydraulic system mounted in the hydraulic excavator according to a first embodiment of the present invention and a control system for the hydraulic system.

FIG. 2 is a diagram depicting an overall configuration including a hydraulic system and a control system for the hydraulic system mounted in the hydraulic excavator according to a first embodiment of the present invention.

The hydraulic system will first be described.

The hydraulic system mounted in the hydraulic excavator includes: a diesel engine 10 (hereinafter, simply referred to as "engine") that is a prime mover; a variable displacement hydraulic pump 12 driven by the engine 10; a control valve 16 incorporating therein a plurality of control spools controlling flows of hydraulic fluids supplied to a plurality of actuators 14 (only one of which is depicted in FIG. 2 for the sake of convenience); a main relief valve 18 that is connected to a hydraulic line of a hydraulic pump 12 and that regulates an upper limit of a pressure applied to the control valve 16 (delivery pressure of the hydraulic pump 12); a plurality of hydraulic pilot type operation devices 20 (only one of which is depicted in FIG. 2 for the sake of convenience) generating command pilot pressures (operation signals) to switch over the plurality of control spools incorporated in the control valve 16; a shuttle valve block 22 incorporating therein a plurality of shuttle valves that select a highest command pilot pressure among the command pilot pressures introduced from the plurality of operation devices 20 to the control valve 16 and that generate a pump flow rate control pressure; and a regulator 24 that controls a tilting amount (displacement volume, that is, capacity) of the hydraulic pump 12 and controls the delivery flow rate of the hydraulic pump 12.

Each of the plurality of operation devices 20 has an operation lever 20*a* and generates the command pilot pressure by operator's operating the operation lever 20*a*, and the intended hydraulic actuator is driven by guiding this command pilot pressure to the control valve 16.

The hydraulic excavator depicted in FIG. 1 operates under a mechanism such that the hydraulic fluid delivered from the hydraulic pump 12 is supplied to each hydraulic actuator 14 via the control valve 16 in this way.

The regulator 24 has a pump actuator 26 that drives a displacement volume change member (for example, a swash plate) of the hydraulic pump 12, and a pump flow control valve 28 and a pump torque control valve 30 that control a hydraulic pressure introduced to the pump actuator 26 and that control a tilting amount of the hydraulic pump 12.

The control system will next be described.

The control system includes: a rotary dial type target rotation speed indicating device 32 that generates an indication signal of a target rotation speed of the engine 10 by operator's operating rotation; an engine rotation sensor 33 that detects a rotation speed (an actual rotation speed) of the engine 10; a pressure sensor 21 that detects a delivery pressure of the hydraulic pump 12; a plurality of pressure sensors 35 as operation sensors (only one of which is depicted in FIG. 2 for the sake of convenience) that detect command pilot pressures (operation signals) generated by the plurality of operation devices 20; a pressure sensor 36 that detects a pump flow control pressure generated by the shuttle valve block 22; a controller 37 to which the indication signal from the target rotation speed indicating device 32 and detection signals from the engine rotation sensor 33 and the pressure sensors 21, 35, and 36 are input, and which performs predetermined computing processing; a display device 38 to which a display signal from the controller 37 is input and which displays time history data (to be described later) of a feature variable; and a flow control solenoid valve 39 and a torque control solenoid valve 40 to which a command signal from the controller 37 is input and which output a flow control pressure and a torque control pressure to the pump flow control valve 28 and the pump torque control valve 30 of the regulator 24, respectively.

Figure 3:
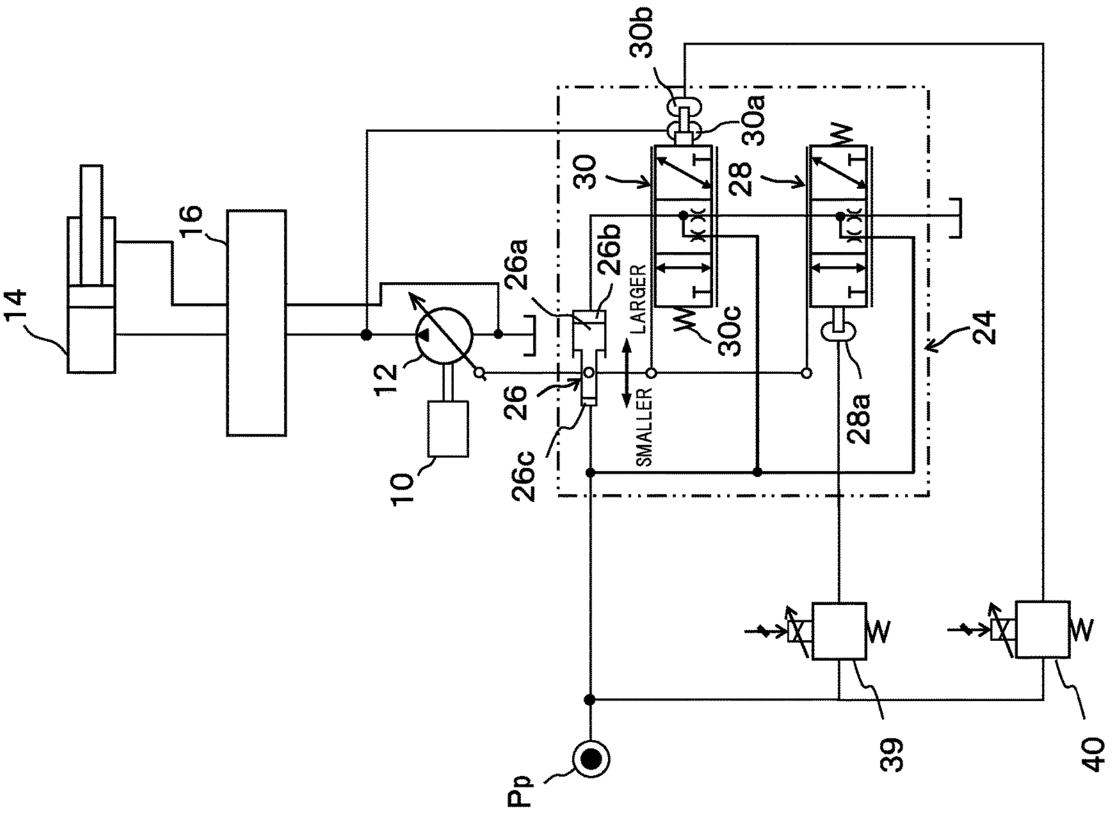
FIG. 3 is a diagram depicting details of a regulator.

FIG. 3 is a diagram depicting details of the regulator 24.

The regulator 24 has the pump actuator 26 that drives the displacement volume change member of the hydraulic pump 12, and the pump flow control valve 28 and the pump torque control valve 30 that control a driving pressure introduced to the pump actuator 26 and that control the tilting amount of the hydraulic pump.

The pump actuator 26 is a servo piston including an actuating piston 26*a* having a large-diameter pressure receiving section 26*b* and a small-diameter pressure receiving section 26*c*, a control pressure adjusted by the pump flow control valve 28 and the pump torque control valve 30 to a pressure in a range of a constant pilot pressure of a pilot pump Pp from a tank pressure is introduced to the large-diameter pressure receiving section 26*b*, and the constant pilot pressure of the pilot pump Pp is introduced to the small-diameter pressure receiving section 26*c*. When the same constant pilot pressure of the pilot pump Pp is introduced to both of the pressure receiving sections 26*b* and 26*c*, then the actuating piston 26*a* moves in a left direction in FIG. 3, a tilting amount of the swash plate of the hydraulic pump 12 is reduced, and a pump delivery flow rate is reduced. When the pressure introduced to the large-diameter pressure receiving section 26*b* decreases, then the actuating piston 26*a* moves in a right direction in FIG. 3, the tilting amount of the swash plate of the hydraulic pump 12 is increased, and the pump delivery flow rate is increased.

The pump flow control valve 28 has a pressure receiving section 28*a* to which the flow control pressure output from the flow control solenoid valve 39 is introduced.

When the flow control pressure output from the flow control solenoid valve 39 is lower, then a spool in the pump flow control valve 28 moves in the left direction in FIG. 3, the constant pilot pressure from the pilot pump Pp is introduced to the large-diameter pressure receiving section 26*b* through the pump flow control valve 28 and the pump torque control valve 39, the tilting amount of the hydraulic pump 12 is reduced, and the pump delivery flow rate is reduced.

When the pump flow control pressure output from the flow control solenoid valve 39 is higher, then the spool in the pump flow control valve 28 moves in the right direction in FIG. 3, and a hydraulic fluid from the large-diameter pressure receiving section 26*b* is introduced to a drain (tank) through the pump torque control valve 30 and the pump flow control valve 28, so that the tilting amount of the hydraulic pump 12 is increased, and the pump delivery flow rate is increased.

In this way, the pump flow control valve 28 controls the pump delivery flow rate in such a manner that the pump delivery flow rate is equal to a pump flow rate in response to the pump flow control pressure.

The pump torque control valve 30 has a pressure receiving section 30*a* to which a delivery pressure of the hydraulic pump 12 is introduced and a pressure receiving section 30*b* to which the torque control pressure output from the torque control solenoid valve 40, and a spring 30*c* is located opposite to the pressure receiving sections 30*a* and 30*b*.

When a hydraulic force by the delivery pressure of the hydraulic pump 12 introduced to the pressure receiving section 30*a* is lower than a difference value between an urging force of the spring 30*c* and a hydraulic force by the torque control pressure of the torque control solenoid valve 40 introduced to the pressure receiving section 30*b*, then a spool in the pump torque control valve 30 moves in the right direction in FIG. 3, the large-diameter pressure receiving section 26*b* is made in communication with the pump flow control valve 28, and the pump delivery flow rate is determined by the pump flow control valve 28.

When the hydraulic force by the delivery pressure of the hydraulic pump 12 introduced to the pressure receiving section 30*a* is higher than the difference value between the urging force of the spring 30*c* and the hydraulic force by the torque control pressure of the torque control solenoid valve 40 introduced to the pressure receiving section 30*b*, then the spool in the pump torque control valve 30 moves in the left direction in FIG. 3, the constant pilot pressure from the pilot pump Pp is introduced to the large-diameter pressure receiving section 26*b* through the pump torque control valve 30, the tilting amount of the hydraulic pump 12 is smaller, and the pump delivery flow rate is reduced.

In this way, the delivery flow rate of the hydraulic pump 12 is reduced in response to a rise of the delivery pressure of the hydraulic pump 12, thereby exercising control in such a manner that an absorption torque of the hydraulic pump 12 does not exceed a maximum torque determined by the difference value between the urging force of the spring 30*c* and the hydraulic force by the torque control pressure from the torque control solenoid valve 40 introduced to the pressure receiving section 30*b*.

Furthermore, the maximum torque is variable by the torque control pressure from the torque control solenoid valve 40. This respect will be described later.

Figure 4:
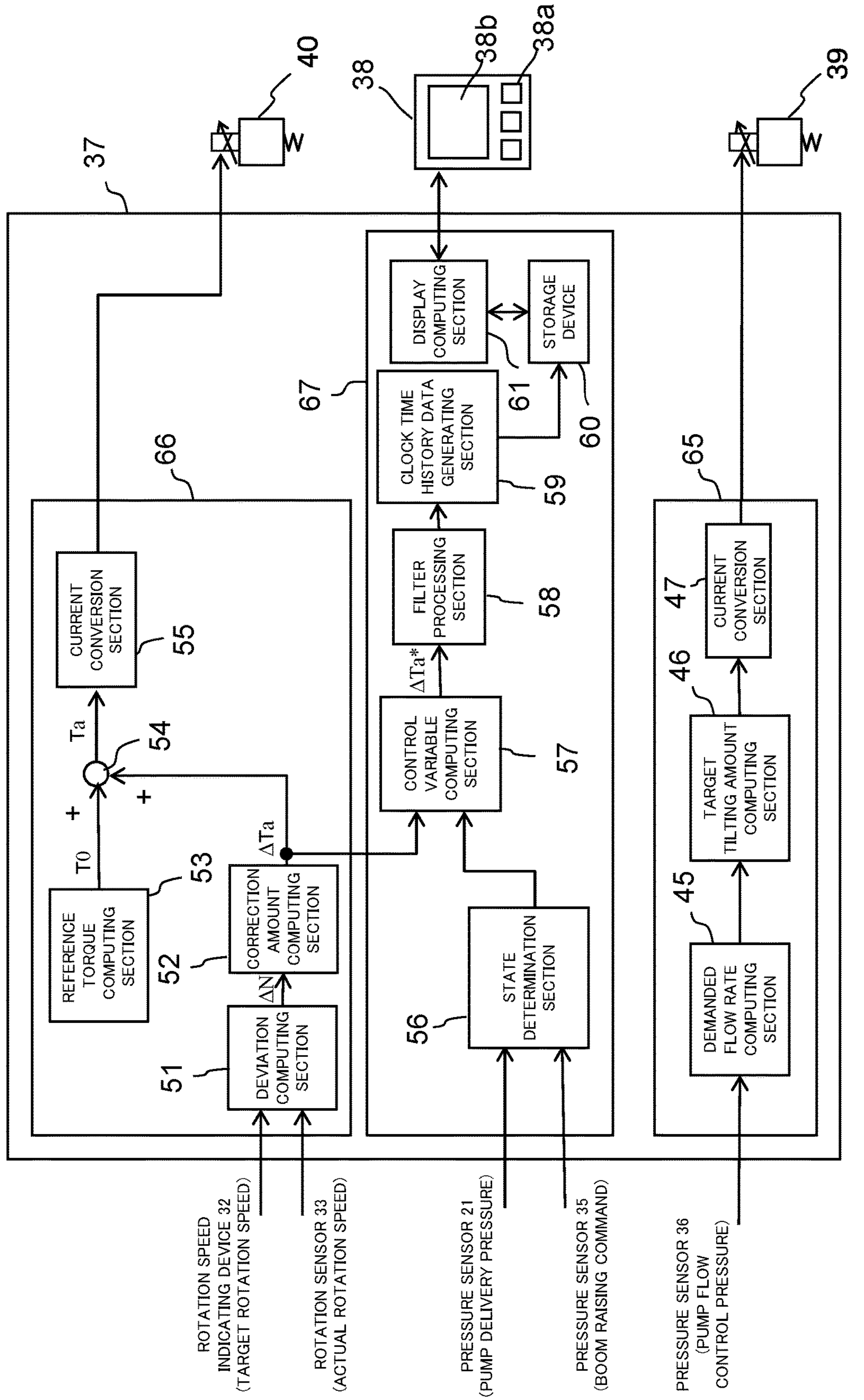
FIG. 4 is a functional block diagram depicting a processing content of a controller.

FIG. 4 is a functional block diagram depicting a processing content of the controller 37.

The controller 37 is configured to determine whether the hydraulic pump 12 is in a preset loaded state for acquiring diagnosis data of the engine 10, validate a controlled variable related to a torque command value of speed sensing control as the diagnosis data of the engine 10 when it is determined that the hydraulic pump 12 is in the preset loaded state, generate time history data using this validated controlled variable as a current feature variable, and enable this time history data to be displayed as trend data for engine diagnosis on the display device 38.

Details of the processing content will be described hereinafter.

The controller 37 has a flow control computing section 65 of positive pump control and a torque control computing section 66 for speed sensing control.

The flow control computing section 65 has a demanded flow rate computing section 45 that calculates a demanded flow rate on the basis of the pump flow control pressure (highest command pilot pressure) detected by the pressure sensor 36, a target tilting amount computing section 46 that calculates a target tilting amount of the hydraulic pump 12 from the calculated demanded flow rate, and a current conversion section 47 that converts the calculated target tilting amount into a command current for the flow control solenoid valve 39 and that outputs the command current.

Figure 5:
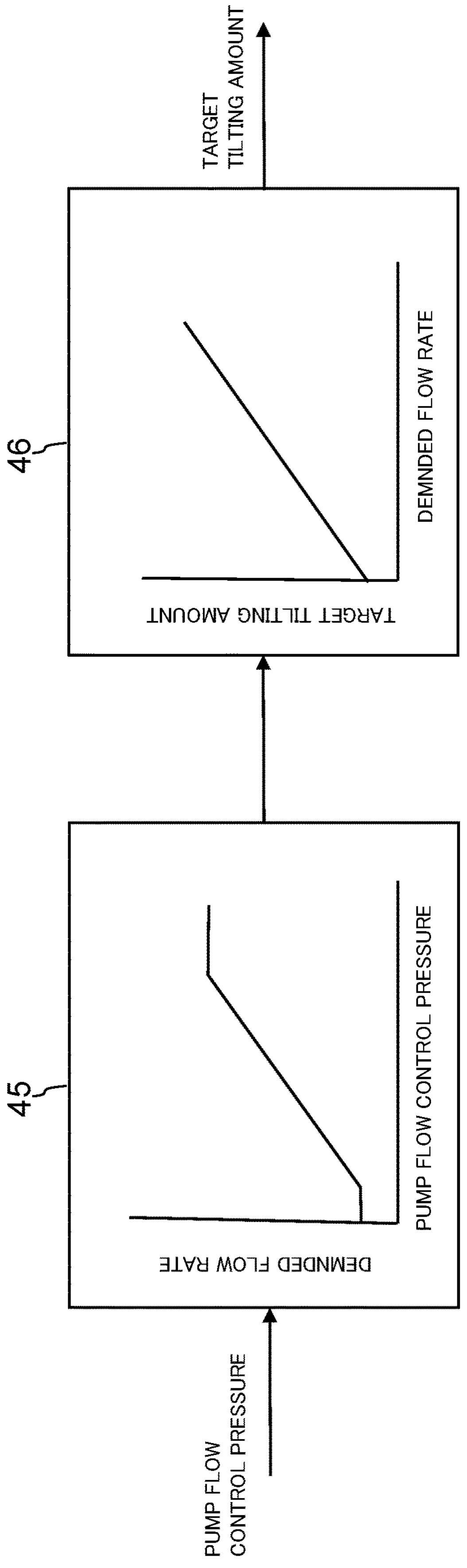
FIG. 5 is a functional block diagram depicting computing contents of a demanded flow rate computing section and a target tilting amount computing section.

FIG. 5 is a functional block diagram depicting computing contents of the demanded flow rate computing section 45 and the target tilting amount computing section 46. The demanded flow rate computing section 45 includes a table of the pump flow control pressure and the demanded flow rate set such that the demanded flow rate increases as the pump flow control pressure increase, and the demanded flow rate computing section 45 calculates a corresponding demanded flow rate by referring the pump flow control pressure detected by the pressure sensor 36 to the table. The target tilting amount computing section 46 includes a table of the demanded flow rate and the target tilting amount set such that the target tilting amount increases as the demanded flow rate increases, and the target tilting amount computing section 46 calculates a corresponding target tilting amount by referring the calculated demanded flow rate to the table.

The current conversion section 47 is configured to generate a command current that is made higher as the target tilting amount is larger, the flow control solenoid valve 39 is excited by the command current and outputs the flow control pressure to the pressure receiving section 28*a* in the pump flow control valve 28, and the delivery flow rate of the hydraulic pump 12 is thereby controlled as previously described. The hydraulic pump 12 can thereby control the delivery flow rate of the hydraulic pump 12 by a scheme referred to as positive pump control to increase the delivery flow rate of the hydraulic pump 12 in response to an operation amount (demanded flow rate) of the operation lever 20*a* of the operation device 20.

With reference back to FIG. 4, the torque control computing section 66 for speed sensing control has: a deviation computing section 51 that performs computing of (actual rotation speed)−(target rotation speed)=(rotation speed deviation) on the basis of the target rotation speed of the engine 10 indicated by the target rotation speed indicating device 32 and the actual rotation speed of the engine 10 detected by the engine rotation sensor 33, and that calculates a rotation speed deviation ΔN; a correction amount computing section 52 that calculates a torque correction amount ΔTa from the calculated rotation speed deviation ΔN; a reference torque computing section 53 that calculates a reference torque T0 of the hydraulic pump 12 determined from an excavator operation, an excavator mode, and the like; an addition section 54 that corrects the reference torque T0 by adding the torque correction amount ΔTa to this reference torque T0 and that calculates a new torque command value Ta of the hydraulic pump 12; and a current conversion section 55 that converts the calculated torque command value Ta into a command current for the torque control solenoid valve 40 and that outputs the command current to the torque control solenoid valve 40. The current conversion section 55 is configured to output the command current that is made higher as the torque command value Ta is lower than the reference torque T0, and the torque control solenoid valve 40 is excited by the command current and outputs the torque control pressure to the pressure receiving section 30*b* in the pump torque control valve 30, and the maximum absorption torque of the hydraulic pump 12 is thereby controlled as described previously.

Figure 6:
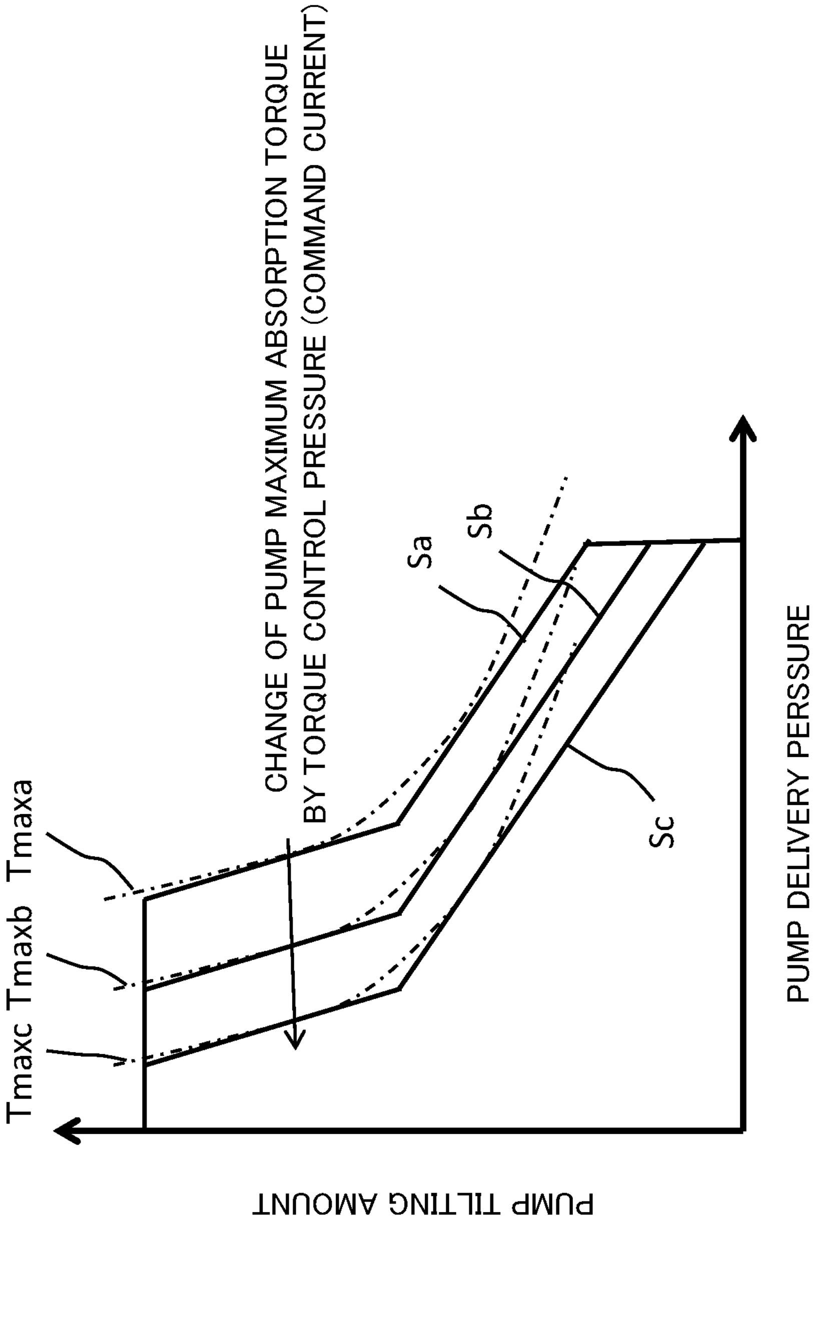
FIG. 6 is a diagram depicting changes in torque characteristics and a maximum torque of a hydraulic pump set by a torque control pressure from a torque control solenoid valve.

FIG. 6 is a diagram depicting changes in torque characteristics and the maximum torque of the hydraulic pump 12 set by the torque control pressure from the torque control solenoid valve 40. When the torque correction amount ΔTa computed by the correction amount computing section 52 is zero, the addition section 54 calculates the torque command value Ta equal to the reference torque T0 calculated by the reference torque computing section 53, and the torque control pressure output from the torque control solenoid valve 40 to the pressure receiving section 30*b* in the pump torque control valve 30 takes on a predetermined value, torque characteristics and the maximum torque of the hydraulic pump 12 set by the regulator 24 are Sa and Tmaxa, respectively. When the absorption torque (load torque) of the hydraulic pump 12 increases and the actual rotation speed of the engine 10 decreases, then the torque correction amount ΔTa takes on a negative value and the torque command value Ta calculated by the addition section 54 decreases. At this time, the torque control pressure output from the torque control solenoid valve 40 to the pressure receiving section 30*b* in the pump torque control valve 30 rises depending on the decrease in the torque command value Ta, and the torque characteristics and the maximum torque of the hydraulic pump 12 set by the regulator 24 are reduced to Sb and Tmaxb, and then to Sc and Tmaxc from Sa and Tmaxa, respectively as indicated by an arrow of FIG. 6 as the torque control pressure rises.

When the hydraulic pump 12 is driven using the engine 10 as in the hydraulic excavator, if the load on the hydraulic pump 12 exceeds the engine torque, it is impossible to drive the hydraulic pump 12, resulting in an engine stop. To prevent this engine stop, the torque control computing section 66 for the speed sensing control over the engine 10 is provided.

According to this speed sensing control, even in a case of a reduction in engine output power (torque) or the like for some factor, the output power (absorption torque) of the hydraulic pump 12 is adjusted; thus, the engine output power and the pump absorption torque are controlled in a balanced state. Therefore, grasping this pump control state makes it possible to indirectly grasp a drive state of the engine 10.

The controller 37 further has an engine diagnosis computing section 67 that serves as an engine diagnosing device that diagnoses the engine 10. The engine diagnosis computing section 67 diagnoses the engine 10 by grasping the pump control state by the speed sensing control on the basis of the concept described above.

In the FIG. 4, the engine diagnosis computing section 67 has: a state determination section 56 that determines whether the hydraulic pump 12 is in the preset loaded state for acquiring the diagnosis data of the engine 10; a controlled variable computing section 57 that validates and captures the torque correction amount ΔTa that is the controlled variable related to the torque command value Ta of the speed sensing control as the diagnosis data of the engine 10 when the determination result by the state determination section 56 is satisfied (is true) and when it is determined that the hydraulic pump 12 is in the preset loaded state; a filter processing section 58 that performs low-pass filter processing on this validated torque correction amount ΔTa* (validated controlled variable) for stabilization; a time history data generation section 59 that uses the validated torque correction amount ΔTa* (validated controlled variable) by way of the filter processing section 58 as a current feature variable, that calculates a magnitude of this feature variable and a change in this feature variable and adds time history information to this feature variable, and that generates the time history data of the feature variable for the engine diagnosis; a storage device 60 that stores the generated time history data of the feature variable; and a display computing section 61 that reads the time history data of the feature variable for a predetermined period stored in the storage section 60 in response to a display request from the display device 38 and that causes this time history data to be displayed as trend data for the engine diagnosis on the display device 38.

The display device 38 has an operation section 38*a* and a display screen 38*b*, outputs a display request signal to the controller 37 by operating the operation section 38*a*, and displays the time history data of the feature variable for the predetermined period acquired from the storage device 60 via the display computing section 61 in the controller 37 as the trend data for the engine diagnosis on the display screen 38*b*.

While the engine diagnosis computing section 67 sets the controlled variable to be validated as the diagnosis data of the engine by the controlled variable computing section 57 as the torque correction amount ΔTa, the controlled variable may be other than ΔTa as long as the controlled variable is related to the torque command value Ta of the speed sensing control. For example, when the correction amount computing section 52 is a proportional element computing section, a similar effect can be obtained even using a rotation speed deviation ΔN input from the previous stage and different by a proportional coefficient multiple as the controlled variable. Alternatively, the torque command value Ta of the speed sensing control may be used as the controlled variable per se.

Furthermore, the display device 38 is not limited to the display device provided in the hydraulic excavator but may be a display device provided outside of the hydraulic excavator such as that provided in an administrative room. In that case, information may be exchanged via wireless communication means.

Details of determination processing of the state determination section 56 will next be described.

In the present embodiment, the state determination section 56 validates the torque correction value ΔTa as the engine diagnosis data while limiting the preset loaded state of the hydraulic pump 12 for acquiring the diagnosis data of the engine 10 to a specific operation scene of the hydraulic system that satisfies a diagnosis condition for the engine 10. The specific operation scene of the hydraulic system that satisfies the diagnosis condition for the engine 10 means herein an operation scene where the load torque (absorption torque) of the hydraulic pump 12 is in a stable state.

Specifically, at a time of warming-up or the like of the engine 10 or a hydraulic operating fluid, from a view point of easiness and security assurance of the work, it often occurs that the boom 104 is raised to set the boom cylinder 112 into a stroke end state, the operation lever 20*a* of the boom operation device 20 is fully operated, the delivery pressure of the hydraulic pump 12 is raised up to a set pressure of the main relief valve 18, and the main relief valve 18 is set into a relief state. In this operation scene, the delivery flow rate and the delivery pressure of the hydraulic pump 12 are kept at certain values; thus, it is possible to easily estimate the loaded state of the hydraulic pump 12. The state determination section 56 estimates such a loaded state of the hydraulic pump 12 (loaded state in which the delivery pressure of the hydraulic pump 12 is constant to be equal to the relief pressure of the main relief valve 18, and in which the tilting amount of the hydraulic pump 12 is constant) as the specific operation scene that satisfies the diagnosis condition for the engine 10, and validates the torque correction amount ΔTa to the torque correction amount ΔTa* while limiting the preset loaded state of the hydraulic pump 12 to such an operation scene.

Figure 7A:
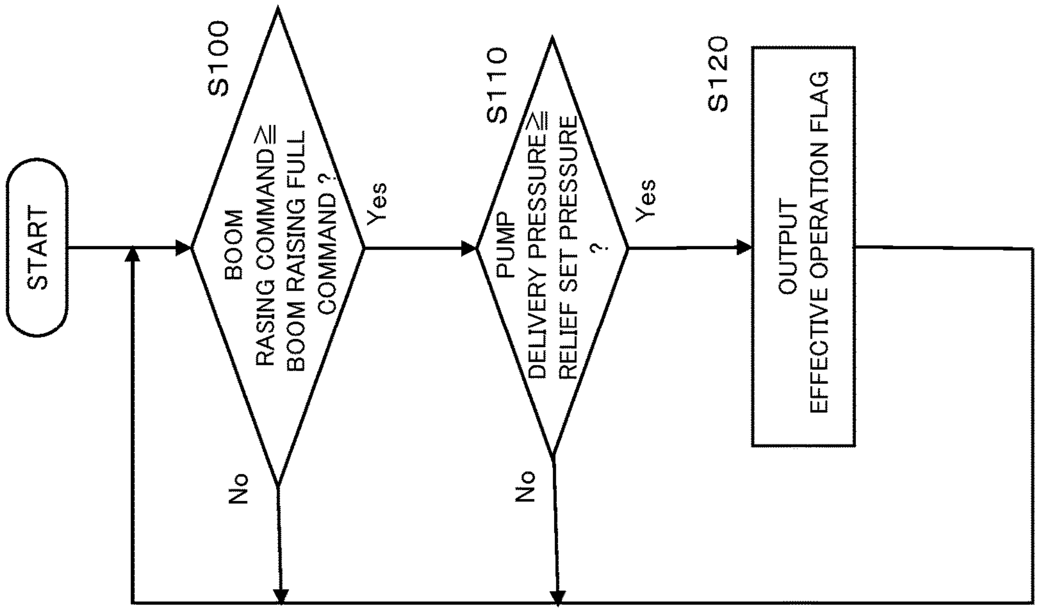
FIG. 7A is a flowchart depicting a processing content of a state determination section.

FIG. 7A is a flowchart depicting a processing content of the state determination section 56.

The state determination section 56 determines whether the operation device 20 is fully operated in a boom raising direction and the main relief valve 18 is in the relief state on the basis of the operation signal for boom raising of the operation device 20 detected by the pressure sensor 35 (operation sensor) and the delivery pressure of the hydraulic pump 12 detected by the pressure sensor 21 (Steps S100 and S110), and determines that the hydraulic system is in the specific operation scene and the hydraulic pump 12 is in the preset loaded state when the operation device 20 is fully operated in the boom raising direction and the main relief valve 18 is in the relief state, and then outputs a valid operation flag (Step S120).

Figure 7B:
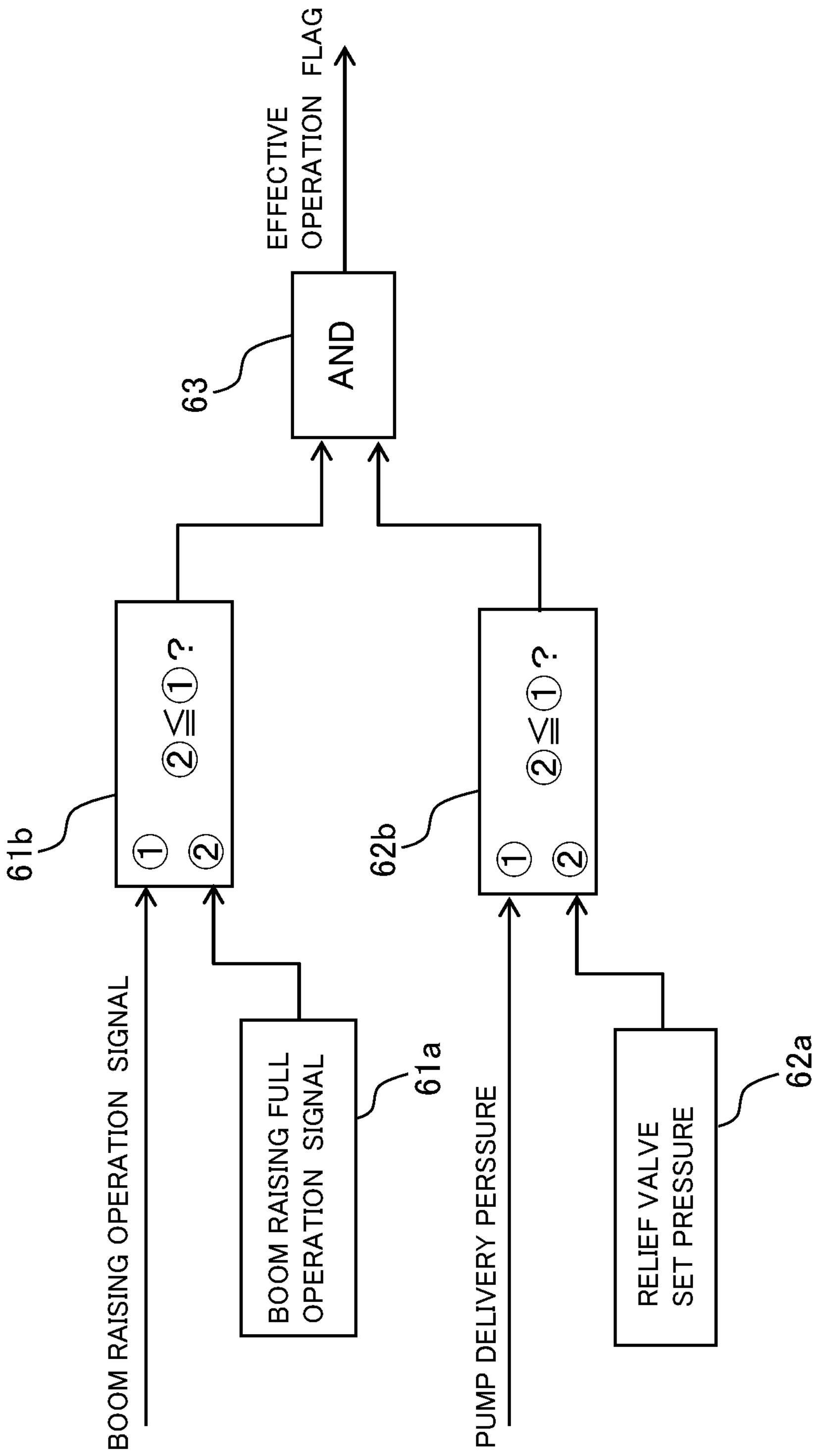
FIG. 7B is a functional block diagram depicting the processing content of the state determination section.

FIG. 7B is a functional block diagram depicting the processing content of the state determination section 56.

The state determination section 56 causes a comparison section 61*b* to compare the operation signal (command pilot pressure) indicating boom raising of the operation device 20 detected by the pressure sensor 35 (operation sensor) with an operation signal (command pilot pressure) indicating a boom fully raising operation and preset to a setting section 61*a*, and determines whether the operation signal indicating the boom raising is equal to or greater than the operation signal indicating the boom fully raising operation. Furthermore, the state determination section 56 causes a comparison section 62*b* to compare the delivery pressure of the hydraulic pump 12 detected by the pressure sensor 21 with the set pressure of the main relief valve 18 preset to a setting section 62*a*, and determines whether the delivery pressure of the hydraulic pump 12 is equal to or higher than the set pressure of the main relief valve 18. When the operation signal indicating the boom raising is equal to or greater than the operation signal indicating the boom fully raising operation and the delivery pressure of the hydraulic pump 12 is equal to or higher than the set pressure of the main relief valve 18 (when AND conditions are satisfied), the state determination section 56 determines that the hydraulic system is in the specific operation scene described above, and outputs the valid operation flag (Step S120). This valid operation flag serves as a flag it is determined that the hydraulic pump 12 is in the preset loaded state for acquiring the diagnosis data of the engine 10.

It is noted that in the embodiment described above, the specific operation scene is determined by detecting that the operation lever 20*a* is fully operated. However, if the tilting amount of the hydraulic pump 12 can be directly grasped, the tilting amount may be directly calculated and evaluated as an alternative to detecting that the operation lever 20*a* is fully operated. In this case, it is not necessary for the tilting amount to be a maximum value but it suffices to be capable of detecting that the tilting amount is controlled to be a certain fixed value (in a stable state). More specifically, it suffices to grasp that the load torque of the hydraulic pump is in a stable state. Because of (load torque)=(pressure)×(tilting amount), obtaining a state in which the tilting amount is equal to the fixed value and a state in which the delivery pressure is fixed (maximum) makes it possible to evaluate that the load torque of the hydraulic pump 12 is in the stable state and that the hydraulic pump 12 is in the preset loaded state.

Operations in the present embodiment will next be described.

While the hydraulic excavator is operating and conducting work, the controller 37 performs the following computing. A case in which the specific operation scene satisfying the diagnosis condition for the engine 10 is the scene where the operation lever is fully operated for the boom raising and the delivery pressure of the hydraulic pump 12 is equal to the relief pressure, will be described herein.

The state determination section 56 acquires the operation signal (command pilot pressure) indicating the boom raising from the detection signal of the pressure sensor 35, causes the comparison section 61*b* to compare the acquired operation signal indicating the boom raising with the preset operation signal indicating the boom fully raising operation, and determines whether the operation signal indicating the boom raising is equal to or greater than the operation signal indicating the boom fully raising operation. Furthermore, the state determination section 56 acquires the delivery pressure of the hydraulic pump 12 from the detection signal of the pressure sensor 21, causes the comparison section 62*b* to compare the acquired delivery pressure with the set pressure of the main relief valve 18, and determines whether the delivery pressure of the hydraulic pump 12 is equal to or higher than the set pressure of the main relief valve 18. When the AND conditions are satisfied in these two comparison sections 61*b* and 62*b*, the state determination section 56 determines that the hydraulic pump 12 is in the preset loaded state for acquiring the diagnosis data of the engine 10, and the valid operation flag indicates a true value.

This valid operation flag and the torque correction amount ΔTa are input to the controlled variable computing section 57, and the controlled variable computing section 57 validates the torque correction amount ΔTa and captures the torque correction amount ΔTa*. The filter processing section 58 performs the low-pass filter processing on this validated torque correction amount ΔTa* over a valid section to obtain a stabilized quantity of state. This quantity of state is the feature variable at a current time. The time history data generation section 59 calculates the magnitude of this feature variable and the change in this feature variable and adds the time history information to the feature variable, generates the time history data of the feature variable for the engine diagnosis, and stores the generated time history data in the storage device 60. While the time history data of the feature variable referred herein is calculated in sequence online, it is possible to reduce a memory area used by the storage device 60 by reducing the time history data to the number of times of sampling necessary for display as the time history data. For example, since even data acquired one piece per hour, one piece per day, or the like can often sufficiently express a tendency of a failure or a degradation to grasp the failure or the degradation, it is possible to minimize information to be handled by decimating the time history data to sampling data sufficient to express the tendency.

As a result, in a case of actuating the hydraulic system in such a manner that the specific load on the hydraulic pump acts on the hydraulic system, it is possible to calculate the torque correction amount ΔTa on the basis of the deviation ΔN between the engine target rotation speed and the actual rotation speed, calculate the feature variable in such a manner that the torque correction amount ΔTa is further subjected to the filter processing to suppress a dynamic influence, and stably calculate the feature variable. By creating the time history data for the engine diagnosis using this feature variable and storing the time history data in the storage device 60, it is possible to display the magnitude of the time history data and the tendency of the change in the time history data on the display device 38 as the trend data for the engine diagnosis.

Figure 8:
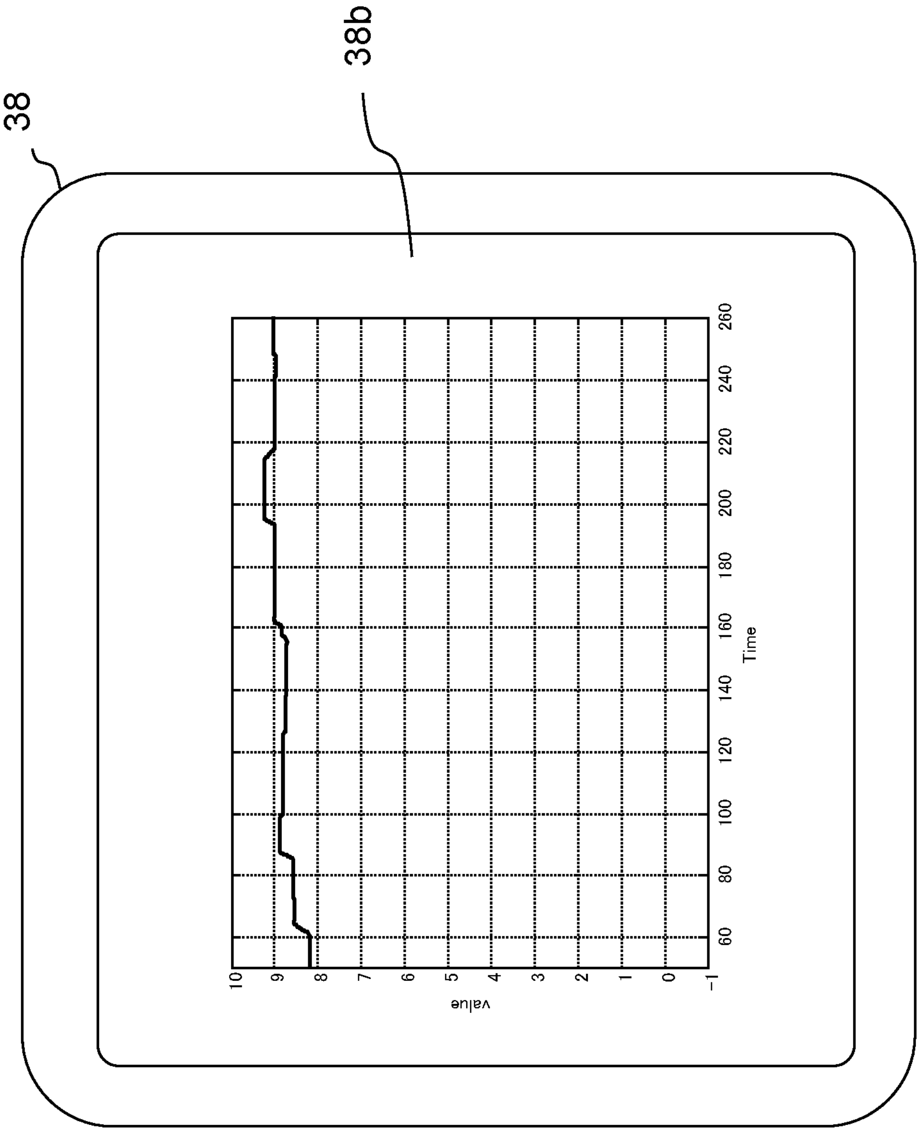
FIG. 8 is a diagram depicting an example of trend data for engine diagnosis displayed on a display screen of a display device.

FIG. 8 is a diagram depicting an example of the trend data for the engine diagnosis displayed on the display screen 38*b* of the display device 38. By operating the display device 38 to display the trend data on the display screen as depicted in FIG. 8 and viewing a temporal change, a confirming person such as the operator or a maintenance person can determine a degree of the degradation of the engine 10.

In this way, according to the present embodiment, the controller 37 determines whether the hydraulic pump 12 is in the preset loaded state, and validates the controlled variable (for example, the torque correction value ΔTa) related to the torque command value Ta of the speed sending control as the diagnosis data of the engine 10 and enables the controlled variable to be displayed as the trend data for the engine diagnosis when it is determined that the hydraulic pump 12 is in the preset loaded state; thus, it is thereby possible to greatly reduce the volume of data captured in the controller 37 as the diagnosis data of the engine 10 and suppress a cost required to perform diagnosis of the degradation such as the reduction in the output power of the engine 10.

Furthermore, the time history data for the engine diagnosis is generated as the diagnosis data of the engine 10 by validating the controlled variable related to the torque command value Ta of the speed sensing control when the hydraulic pump 12 is in the preset loaded state (operation scene where the load torque of the hydraulic pump 12 is in the stable state), it is possible to suppress diagnosis noise based on a measurement error or the like, accurately grasp a situation of the reduction in the output power of the engine 10, and improve accuracy of the diagnosis of the engine degradation as depicted in FIG. 8.

While a case in which the number of hydraulic pumps is one has been described in the above embodiment, it is also possible to calculate loaded states of a plurality of hydraulic pumps by similarly calculating a load on each hydraulic pump and summing up the loads. Furthermore, as for the torque correction amount ΔTa, it is possible to grasp the state of the engine by calculating the torque correction amount ΔTa of one of the hydraulic pumps since the plurality of hydraulic pumps are driven by the same engine.

Second Embodiment

A second embodiment of the present invention will be described.

In the first embodiment, the state determination section 56 limits the "preset loaded state" of the hydraulic pump 12 for acquiring the diagnosis data of the engine 10 to the specific operation scene of the hydraulic system that satisfies the diagnosis condition for the engine 10; thus, it is possible to accurately grasp the loaded state of the hydraulic pump 12. Owing to this, it is possible to suppress the diagnosis noise and accurately grasp the situation of the reduction in the output power of the engine 10.

On the other hand, however, since the "preset loaded state" of the hydraulic pump 12 for acquiring the diagnosis data of the engine 10 is limited to the specific operation scene, it is estimated that an occurrence frequency of such a limited operation scene is low depending on an environment such as a manner of operator's operation and a content of work, a constraint on a site, and the like, the operation scene for acquiring the diagnosis data is rare depending on situations, and it is impossible to provide good-quality diagnosis.

The second embodiment is intended to improve the respects and to be capable of sufficiently acquiring the diagnosis data of the engine 10. Details of the second embodiment will be described hereinafter. The same parts as those in the first embodiment are denoted by the same reference characters and description thereof is omitted.

A concept of the present embodiment will first be described.

The tilting amount of the hydraulic pump 12 can be calculated within the controller 37 since the tilting amount of the hydraulic pump 12 is controlled by the controller 37. Furthermore, the delivery pressure of the hydraulic pump 12 is detected by the pressure sensor 21 and available within the controller 37. It is, therefore, possible to calculate the loaded state of the hydraulic pump 12 using the pump tilting amount and the pump delivery pressure.

A load torque T acting on the hydraulic pump 12 is expressed by the following Equation.

$$T=q\times P/2\pi$$

q: Tilting amount of hydraulic pump 12 (cc/rev)

P: Delivery pressure of hydraulic pump 12

When a plurality of hydraulic pumps 12 are used, it is possible to calculate a torque of the overall pumps by calculating the tilting amount q and the delivery pressure P of each of the hydraulic pumps 12 to obtain the load torque T and by summing up the load torques T.

Figure 9:
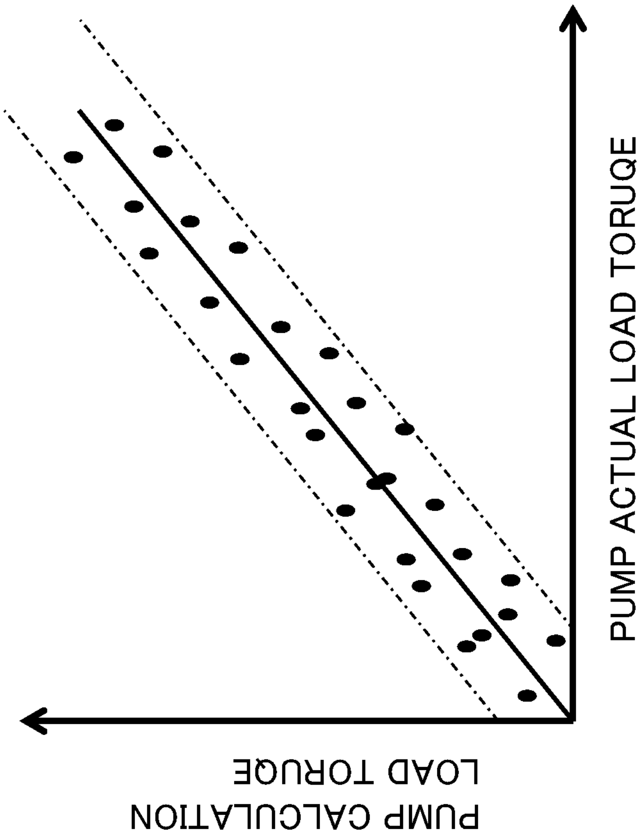
FIG. 9 is a diagram depicting that a calculated load torque of the hydraulic pump tends to have a certain error width with respect to an actual load torque of the hydraulic pump.

In the hydraulic system including such a hydraulic pump 12, taking the measurement error, the noise, and the like of the pressure sensor 25 into consideration, situations of errors in the calculated torque are those depicted in FIG. 9. Since error factors include an error in detection of the delivery pressure of the hydraulic pump 12 and an error in calculation of the tilting amount of the hydraulic pump 12, the calculated load torque of the hydraulic pump 12 tends to have a certain error width with respect to the actual load torque of the hydraulic pump 12. It is, therefore, effective to perform diagnosis and evaluation in a region of a high pump load torque that makes it possible to apparently reduce such error factors.

Figure 10:
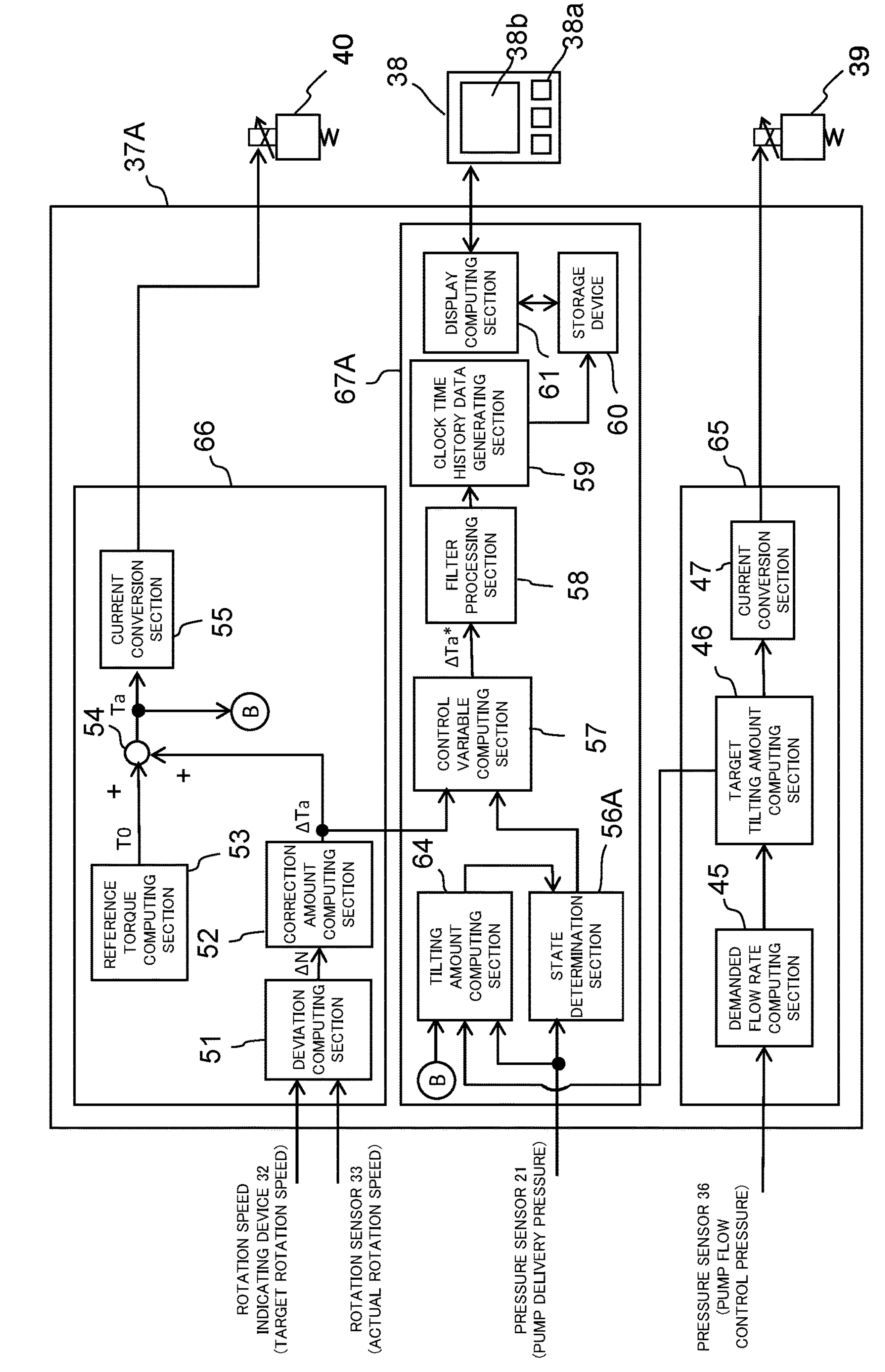
FIG. 10 is a functional block diagram depicting a processing content of a controller according to a second embodiment of the present invention.

FIG. 10 is a functional block diagram depicting a processing content of a controller 37A according to the second embodiment of the present invention.

In the controller 37A, the flow control computing section 65 and the torque control computing section 66 for the speed sensing control are the same as those in the first embodiment. On the other hand, an engine diagnosis computing section (engine diagnosing device) 67A differs from the engine diagnosis computing section 67 according to the first embodiment in that the engine diagnosis computing section 67A further includes a pump tilting amount computing section 64 and the current tilting amount calculated by the pump tilting amount computing section 64 is input to a state determination section 56A as an alternative to the detection signal (boom raising command) of the pressure sensor 35.

Figure 11A:
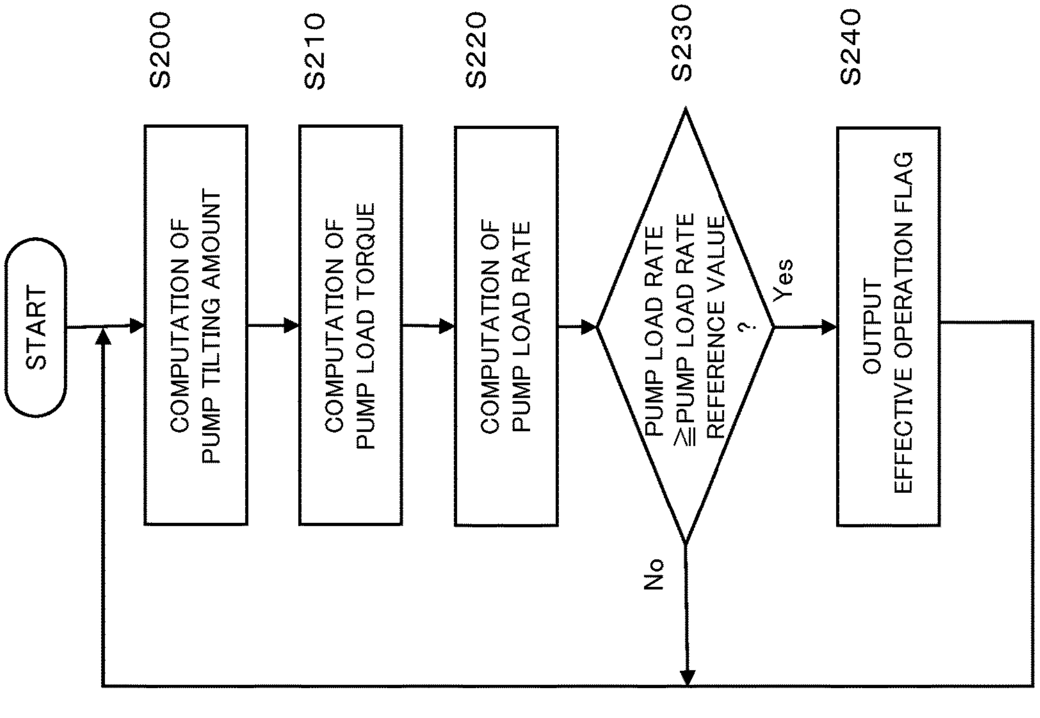
FIG. 11A is a flowchart depicting processing contents of a pump tilting amount computing section and a state determination section.

FIG. 11A is a flowchart depicting processing contents of the pump tilting amount computing section 64 and the state determination section 56A.

The controller 37A causes the pump tilting amount computing section 64 to calculate a current tilting amount of the hydraulic pump 12 on the basis of the torque command value Ta calculated by the torque control computing section 66 for the speed sensing control, the delivery pressure of the hydraulic pump 12 detected by the pressure sensor 21, and the target tilting amount calculated by the flow control computing section 65 for the positive pump control (Step S200). Next, the controller 37A causes the state determination section 56A to calculate the load torque of the hydraulic pump 12 using the pump tilting amount calculated by the pump tilting amount computing section 64 and the delivery pressure of the hydraulic pump 12 detected by the pressure sensor 21 (Step S210), to further calculate a pump load rate by dividing the load torque by a maximum pump torque Tmax of the hydraulic pump 12 (S220), to determine whether this pump load rate is equal to or higher than a preset pump load rate (S230), and to determine that the hydraulic pump 12 is in the preset loaded state when the pump load rate is equal to or higher than a preset pump load rate and to output the effective operation flag (S240).

Figure 11B:
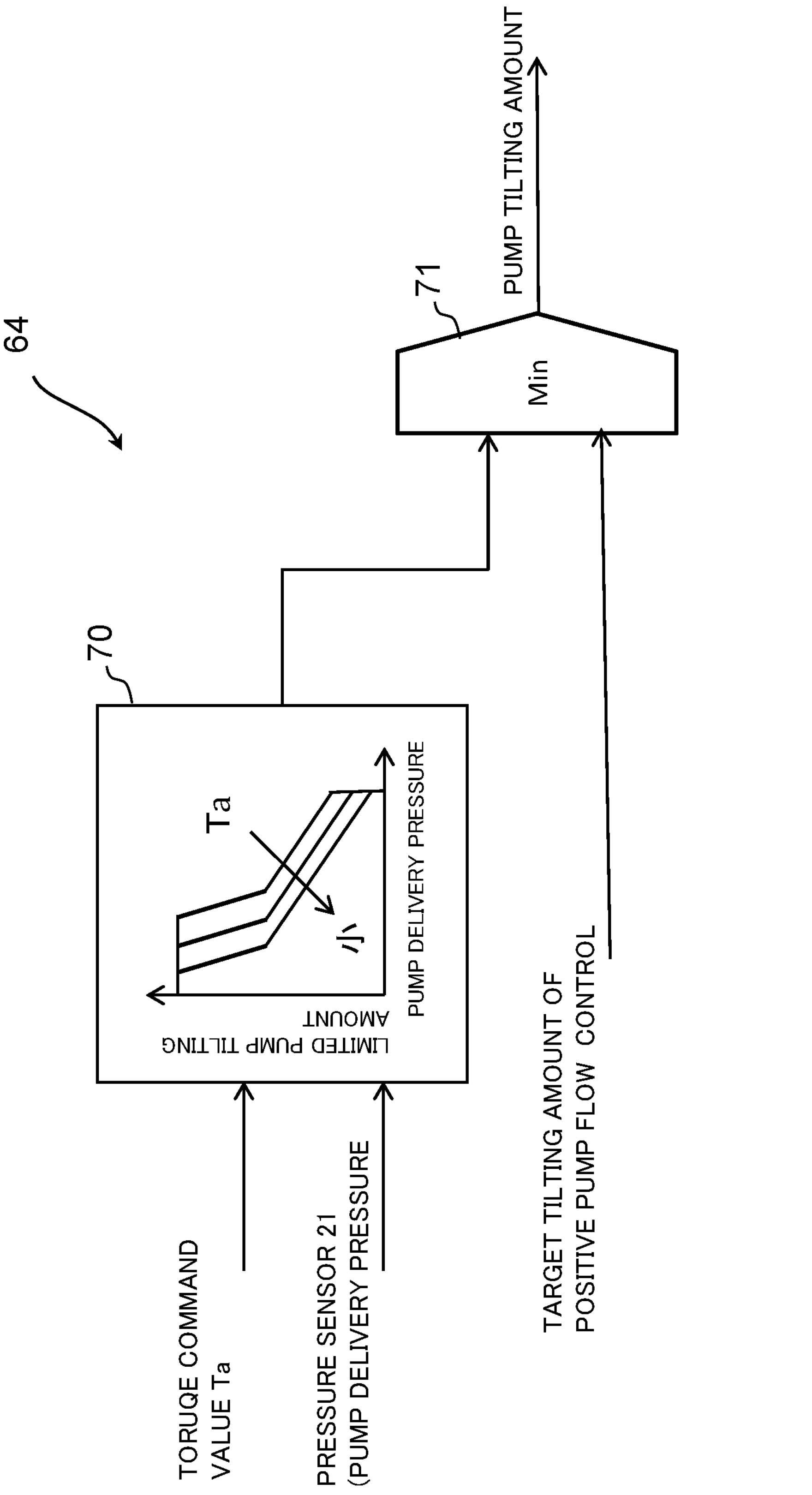
FIG. 11B is a functional block diagram depicting a processing content of the pump tilting amount computing section.

FIG. 11B is a functional block diagram depicting the processing content of the pump tilting amount computing section 64. The pump tilting amount computing section 64 has a limited tilting amount computing section 70 and a minimum value selection section 71.

The torque characteristics of the hydraulic pump 12 depicted in FIG. 6 are set in the limited tilting amount computing section 70, and the pump tilting amount computing section 64 causes the limited tilting amount computing section 70 to calculate a limited pump tilting amount for the speed sensing control on the basis of the torque command value Ta calculated by the torque control computing section 66 for the speed sensing control and the delivery pressure of the hydraulic pump 12 detected by the pressure sensor 21. In other words, the limited tilting amount computing section 70 updates the torque characteristics of the hydraulic pump 12 in such a manner that the maximum torque is made lower as the torque command value Ta is smaller, refers to the delivery pressure of the hydraulic pump 12 corresponding to the updated torque characteristics, and calculates the limited pump tilting amount for the speed sensing control at that time.

Next, the pump tilting amount computing section 64 causes the minimum value selection section 71 to select, as a current tilting amount of the hydraulic pump 12, a smaller tilting amount out of the limited pump tilting amount calculated by the limited pump tilting amount computing section 70 and the target tilting amount calculated by the flow control computing section 65 of the positive pump control.

In this way, the pump tilting amount computing section 64 estimates the current tilting amount of the hydraulic pump 12 by performing computing processing simulating operations of the regulator 24.

It is noted that when the hydraulic pump 12 includes a position sensor that detects the tilting amount, a measurement value by the position sensor may be used as an alternative to a calculated value by the pump tilting amount computing section 64.

Figure 11C:
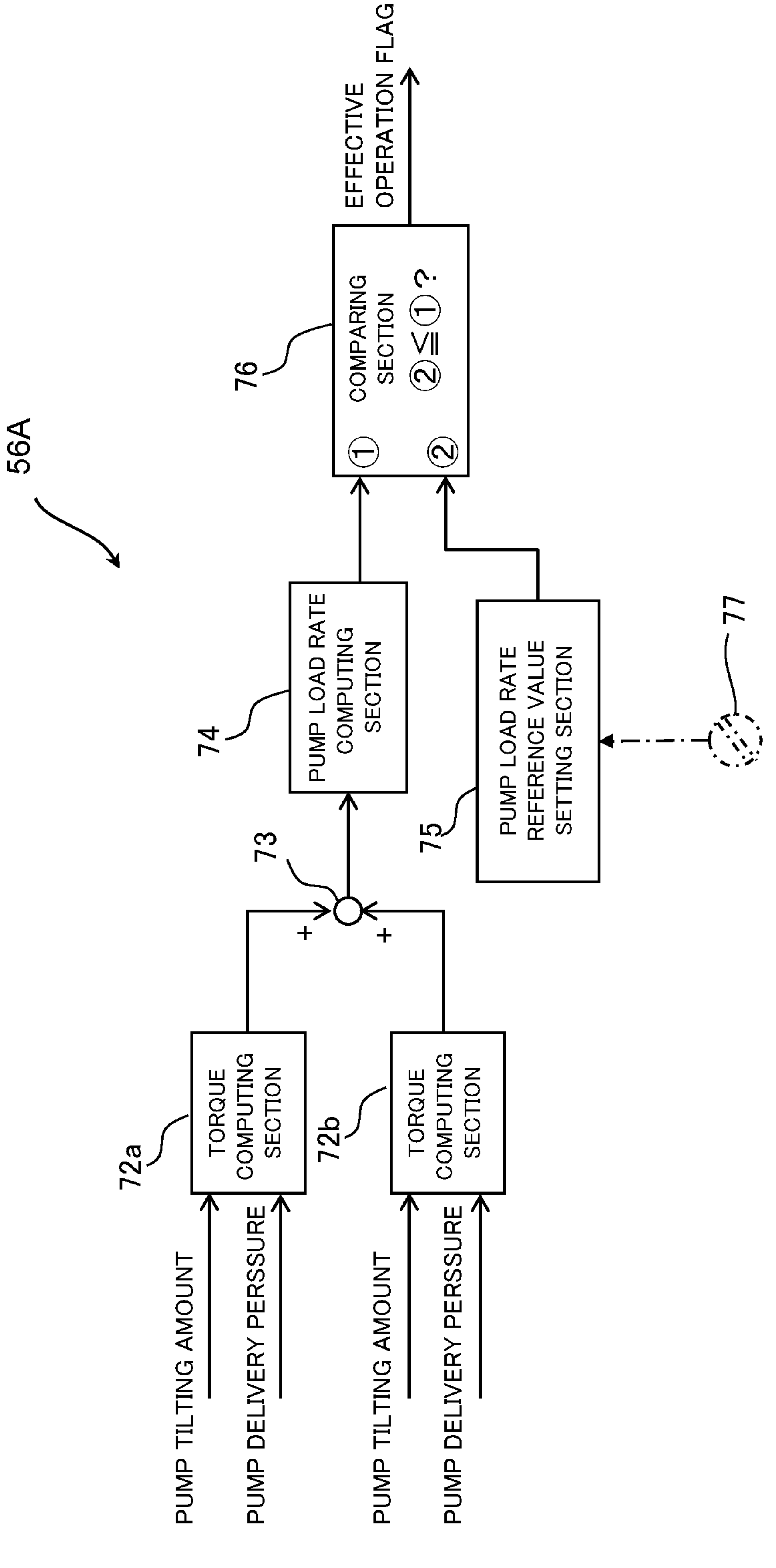
FIG. 11C is a functional block diagram depicting a processing content of the state determination section.

FIG. 11C is a functional block diagram depicting a processing content of the state determination section 56A. It is noted that FIG. 11C depicts a case in which the number of hydraulic pumps is two. The state determination section 56A has torque computing sections 72*a* and 72*b*, an addition section 73, a pump load rate computing section 74, a pump load rate reference value setting section 75, and a comparison section 76.

The state determination section 56A causes the torque computing section 72*a* to calculate the load torque of the hydraulic pump 12 from the Equation described above using the tilting amount of the hydraulic pump 12 calculated by the pump tilting amount computing section 64 and the delivery pressure of the hydraulic pump 12 detected by the pressure sensor 21. Likewise, the state determination section 56A causes the torque computing section 72*b* to calculate the load torque of the hydraulic pump that is not depicted. Next, the state determination section 56A causes the addition section 73 to calculate a total load torque of the two hydraulic pumps by adding up those load torques. Next, the state determination section 56A causes the pump load rate computing section 74 to calculate a pump load rate by dividing the total load torque of the two hydraulic pumps by the maximum pump torque Tmax in pump specifications of the hydraulic pump 12. A pump load rate that satisfies the diagnosis condition for the engine 10 is set, as a pump load rate reference value, in the pump load rate reference value setting section 75 in advance, the state determination section 56A then causes the comparison section 76 to compare the pump load rate calculated by the pump load rate computing section 74 with the pump load rate reference value thereof, determines that the two hydraulic pumps are each in the preset loaded state for acquiring the diagnosis data of the engine 10 when the pump load rate calculated by the pump load rate computing section 74 is equal to or higher than the pump load rate reference value, and outputs a valid operation flag.

The engine diagnosis computing section 67A calculates the feature variable similarly to the first embodiment on the basis of this valid operation flag, and enables the trend data for the engine diagnosis to be displayed on the display device 38.

Operations in the second embodiment will next be described.

In the second embodiment, when the load rates of the two hydraulic pumps 12 are each equal to or higher than the preset load rate reference value during operator's normal work, it is determined that the two hydraulic pumps are each in the preset loaded state for acquiring the diagnosis data of the engine 10, and the torque correction value ΔTa is validated as the diagnosis data of the engine and the feature variable is calculated only at that time. It is assumed herein that the pump load rate (pump load rate reference value) that satisfies the diagnosis condition for the engine 10 is, for example, 70%, and that the two hydraulic pumps are each in the preset loaded state for acquiring the diagnosis data of the engine 10 when each calculated pump load rate is equal to or higher than 70%.

The pump tilting amount computing section 64 sequentially calculates the tilting amounts of the two hydraulic pumps while the hydraulic excavator is making a certain operation, the torque computing sections 72*a* and 72*b* in the state determination section 56A compute the load torques of the two hydraulic pumps on the basis of the pump tilting amounts and the input delivery pressures of the two hydraulic pressures, and the addition section 73 adds up those load torques to calculate the load torque of the overall pumps. Furthermore, the pump load rate computing section 74 computes a load rate with respect to the maximum pump torque Tmax in the pump specifications, and the comparison section 76 compares the calculated load rate with that pump load rate reference value of 70%. When the calculated load rate is equal to or lower than 70%, then the condition is not satisfied, a new feature variable is not calculated, and a previous value is held. When the load rate is equal to or higher than 70%, then the valid operation flag indicates a true value, and the following computing is performed similarly to the first embodiment.

This valid operation flag and the torque correction amount ΔTa are input to the controlled variable computing section 57, the controlled variable computing section 57 validates the torque correction amount ΔTa and captures the torque correction amount ΔTa*, the filter processing section 58 performs the low-pass filter processing on this validated torque correction amount ΔTa* to obtain a feature variable at a current time. The time history data generation section 59 calculates the magnitude of this feature variable and the change in this feature variable and adds the time history information to the feature variable, generates the time history data of the feature variable for the engine diagnosis, and stores the generated time history data in the storage device 60. The display computing section 61 reads the time history data of the feature variable for a predetermined period stored in the storage device 60 in response to a display request from the display device 38 and causes this time history data to be displayed as trend data for the engine diagnosis on the display device 38.

It is thereby possible to improve accuracy of the diagnosis of the engine degradation while suppressing a cost required to perform diagnosis of the degradation such as the reduction in the output power of the engine 10, similarly to the first embodiment.

Furthermore, in the present embodiment, since the preset loaded state of the hydraulic pump 12 for acquiring the diagnosis data of the engine 10 is not limited to the specific operation scene of less occurrence frequency, it is possible to sufficiently ensure the operation scenes for acquiring the diagnosis data and always obtain a favorable diagnosis result.

Modifications of Second Embodiment

While the pump load rate reference value is set to 70% in the second embodiment, the load rate may be further reduced when operation scenes for acquiring the diagnosis data are secured and evaluation is to be performed.

Figure 12:
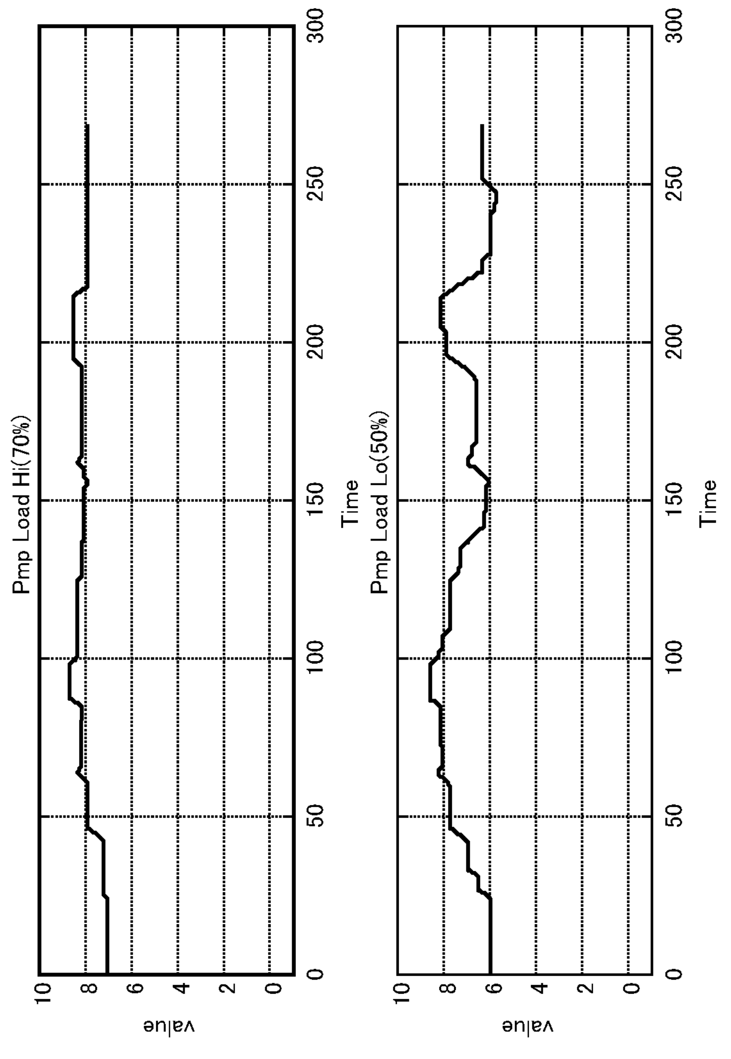
FIG. 12 is a diagram depicting an example of trend data of feature variables when different load rate reference values are used.
Figure 13:
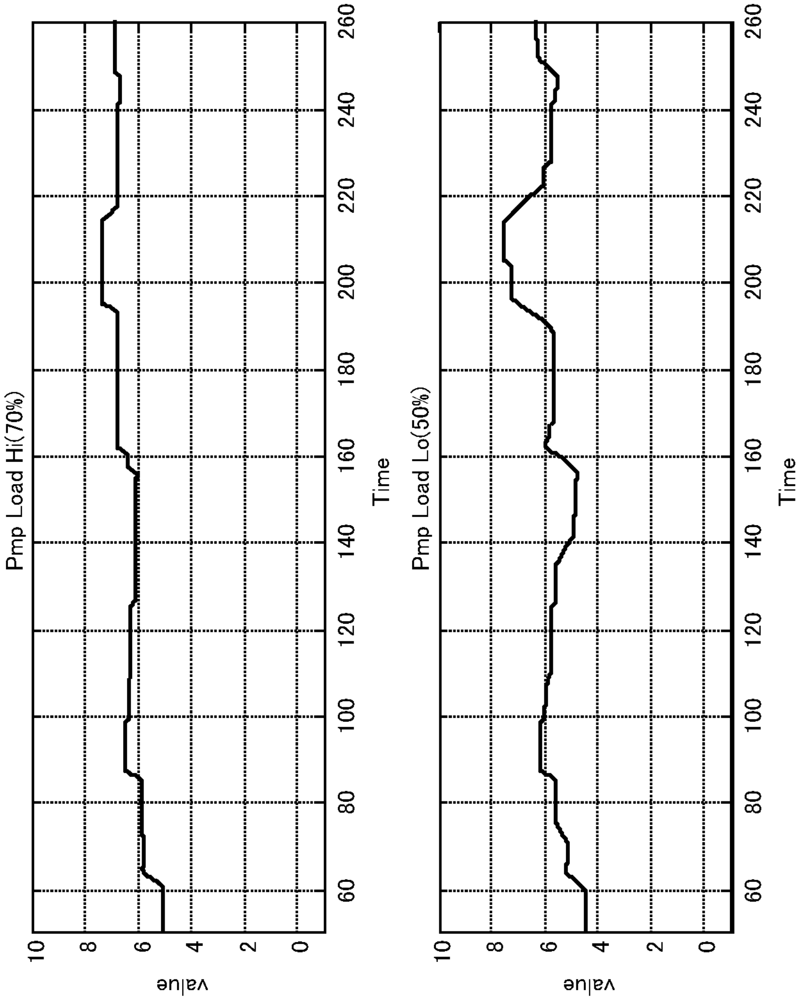
FIG. 13 is a diagram depicting an example of trend data of feature variables when different load rate reference values are used.

FIGS. 12 and 13 depict examples of trend data of the feature variable when different load rate reference values are used. Each of FIGS. 12 and 13 depicts a case in which the load rate reference value is 70% and a case in which the load rate reference value is 50%, FIG. 12 depicts a case in which the change in the feature variable is relatively small, and FIG. 13 depicts a case in which the feature variable gradually increases.

As clear from comparison of the case in which the load rate reference value is 70% with the case in which the load rate reference value is 50% in each of FIGS. 12 and 13, the number of feature variables to be used increases in the case in which the load rate reference value is 50% from that in the case in which the load rate reference value is 70%; thus, it is possible to evaluate more detailed changes. However, as previously described, a region for the evaluation is a region of a low load rate; thus, an error and the like are generated, with the result that the diagnosis and the evaluation are prone to the influence of the noise. It is, therefore, preferable to set the pump load rate reference value while taking into consideration a balance between the number of pieces of data of the feature variables to be used and the influence of the noise on the data.

For this reason, it is desirable to be capable of setting the load rate reference value depending on situations by making it possible to optionally change the load rate reference value from outside.

FIG. 11C depicts such a modification as well as the second embodiment. In other words, as indicated by a chain line in FIG. 11C, a load rate indicating device 77 is provided, thus operator's operating the load rate indicating device 77 makes it possible to adjust the load rate reference value in the pump load rate reference value setting section.

Moreover, there are cases in which adjusting the load rate reference value by the operator is assumed to be cumbersome; thus, a plurality of load rate reference values may be set and the trend data may be displayed by computing feature variables for the plurality of load rate reference values.

Figure 11D:
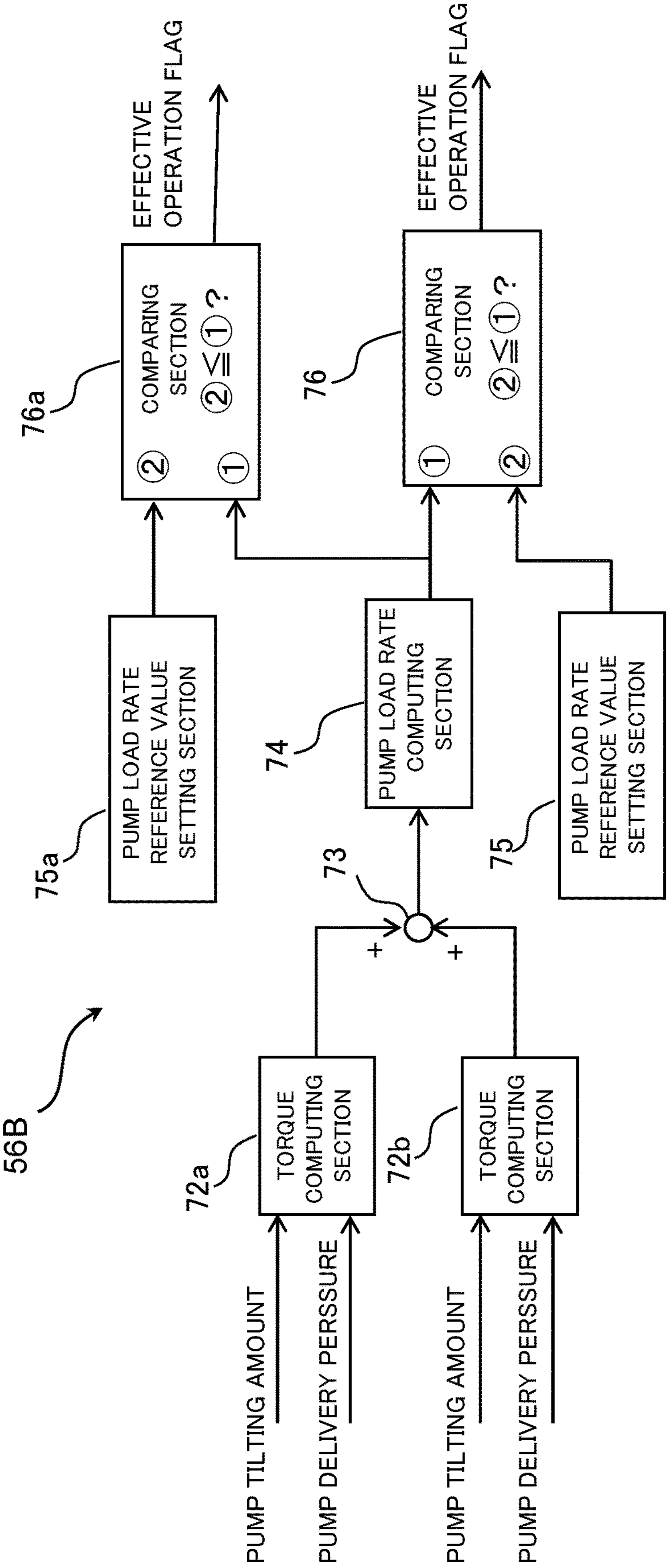
FIG. 11D is a diagram depicting a modification of the state determination section.

FIG. 11D depicts such a modification. A state determination section 56B depicted in FIG. 11D additionally has a pump load rate reference value setting section 75*a* and a comparison section 76*a*, compared with the state determination section 56A depicted in FIG. 11C, a load rate reference value of 70% is set in the pump load rate reference value setting section 75, and a load rate reference value of 50% is set in the pump load rate reference value setting section 75*a*. The comparison sections 76 and 76*a* each compare the calculated load rate with the load rate reference value, the comparison section 76 outputs a first valid operation flag when the calculated load rate is equal to or higher than 70%, and the comparison section 76*a* outputs a second valid operation flag when the calculated load rate is equal to or higher than 50%.

The controlled variable computing section 57, the filter processing section 58, the time history data generation section 59, the storage section 60, and the display computing section 61 perform processing for computing the feature variable in response to each of the first and second valid operation flags, and enable the trend data to be displayed.

Figure 14:
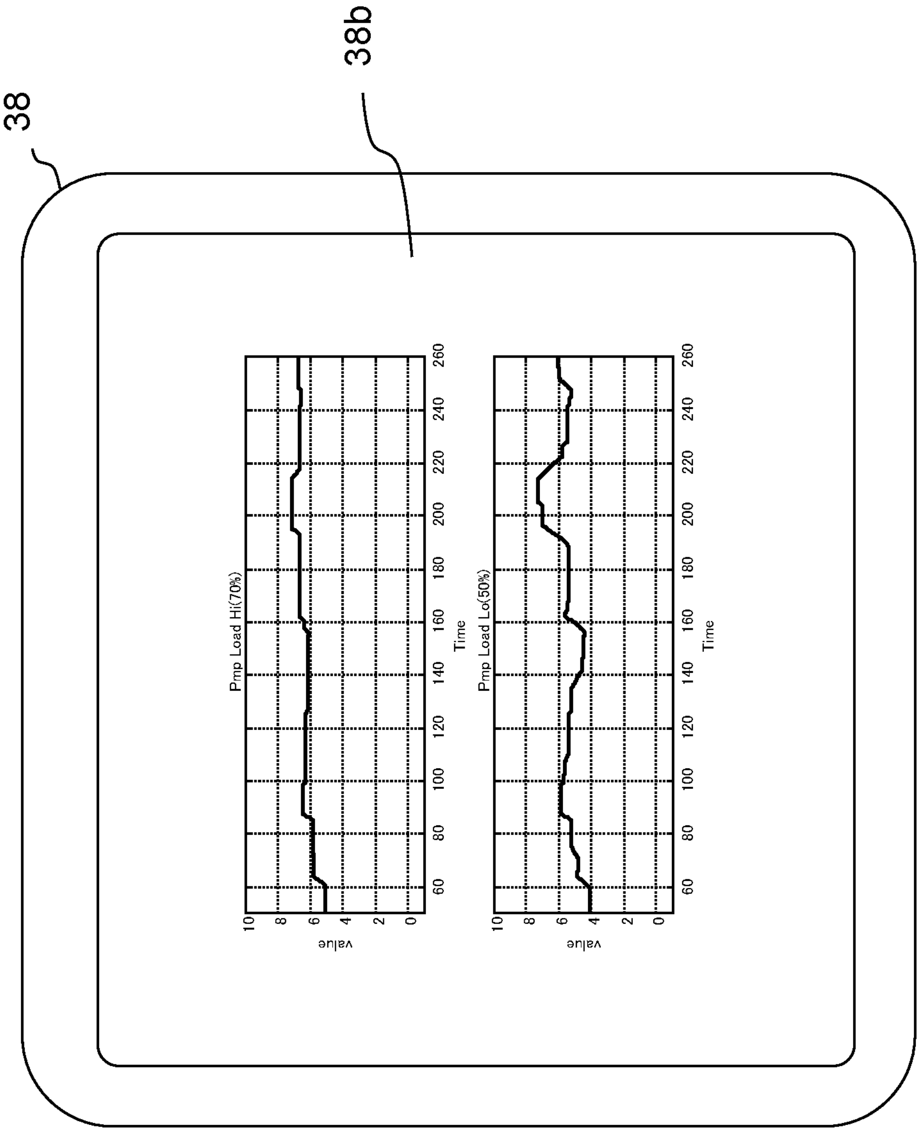
FIG. 14 is a diagram depicting an example of trend data for engine diagnosis displayed on a display screen of a display device according to the modification.

FIG. 14 is a diagram depicting an example of the trend data for the engine diagnosis displayed on the display screen 38*b* of the display device 38 according to such a modification. As depicted in FIG. 14, two types of trend data reflective of an unevenness/fluctuation tendency of the feature variables is displayed on the display screen 38*b*, and the two types of trend data can be simultaneously confirmed. The confirming person such as the operator or the maintenance person can thereby simultaneously confirm the diagnosis data based on the plurality of load rate reference values, make determination while confirming a progress per se, and grasp a stable result.

DESCRIPTION OF REFERENCE CHARACTERS

10: Engine
12: Hydraulic pump
14: Hydraulic actuator
16: Control valve
18: Main relief valve
20: Operation device
20*a*: Operation lever
21: Pressure sensor
22: Shuttle valve block
24: Regulator
26: Pump actuator
28: Pump flow control valve
30: Pump torque control valve
32: Target rotation speed indicating device
33: Engine rotation sensor
35: Pressure sensor (operation sensor)
36: Pressure sensor
37, 37A: Controller (engine diagnosing device)
38: Display device
39: Flow control solenoid valve
40: Torque control solenoid valve
45: Demanded flow rate computing section
46: Target tilting amount computing section
47: Current conversion section
51: Deviation computing section
52: Correction amount computing section
53: Reference torque computing section
54: Addition section
55: Current conversion section
56, 56A: State determination section
57: Control variable computing section
58: Filter processing section
59: Time history data generation section
60: Storage device
61: Display computing section
64: Pump tilting amount computing section
65: Flow control computing section
66: Torque control computing section
67, 67A: Engine diagnosis computing section (engine diagnosing device)
70: Limited tilting amount computing section
71: Minimum value selection section
72*a*, 72*b*: Torque computing section
73: Addition section
74: Pump load rate computing section
75, 75*a*: Pump load rate reference value setting section
76, 76*a*: Comparison section
77: Load rate indicating device

The invention claimed is:

1. A construction machine comprising:

an engine;

a hydraulic system including a variable displacement hydraulic pump driven by the engine, a hydraulic actuator driven by a delivery fluid of the hydraulic pump, and a regulator in which a maximum absorption torque of the hydraulic pump is set and that controls a displacement volume of the hydraulic pump in such a manner that an absorption torque of the hydraulic pump does not exceed the maximum absorption torque;

a rotary dial type target rotation speed indicating device that generates an indication signal of a target rotation speed of the engine;

a rotation sensor that detects an actual rotation speed of the engine;

a controller that computes a torque command value of speed sensing control and converts the torque command value into a command and outputs a command current for controlling the regulator in such a manner that the maximum absorption torque of the hydraulic pump decreases as the absorption torque of the hydraulic pump increases and a rotation speed of the engine decreases, the controller being configured to compute the torque command value of speed sensing control by inputting the indication signal from the rotary dial type target rotation speed indicating device and a detection signal from the rotation sensor, calculate a rotation speed deviation between the target rotation speed and the actual rotation speed, calculate a torque correction amount, from the calculated rotation speed deviation, that decreases the maximum absorption torque of the hydraulic pump as the rotation speed deviation increases, and calculate the torque command value by adding the torque correction amount to a reference torque of the hydraulic pump; and an engine diagnosing device that diagnoses the engine, wherein the engine diagnosing device includes the controller, and wherein the controller is further configured to:

determine whether the hydraulic pump is in a preset loaded state for acquiring diagnosis data of the engine, capture one of the rotation speed deviation, the torque correction amount and the torque command value as a controlled variable related to the speed sensing control and validate the controlled variable as the diagnosis data of the engine when the hydraulic pump is determined to be in the preset loaded state, and generate time history data for an engine diagnosis by using the controlled variable validated as the diagnosis data of the engine, as a current feature variable for the engine diagnosis, and store the generated time history data for the engine diagnosis in a storage device to enable the time history data for the engine diagnosis to be displayed as trend data for engine diagnosis on a display device.

2. The construction machine according to claim 1, wherein the controller is further configured to determine that the hydraulic pump is in the preset loaded state when the hydraulic system is in a specific operation scene where the absorption torque of the hydraulic pump is in a stable state.

3. The construction machine according to claim 2, further comprising:

a work device including a boom;

an operation device for the boom;

an operation sensor that detects an operation signal of the operation device;

a main relief valve connected to a delivery hydraulic line of the hydraulic pump; and a pressure sensor that detects a delivery pressure of the hydraulic pump, wherein the hydraulic actuator is a boom cylinder that drives the boom, and wherein the controller is further configured to:

determine whether the operation device is fully operated in a boom raising direction and the main relief valve is in a relief state on a basis of the operation signal for boom raising of the operation device detected by the operation sensor and the delivery pressure of the hydraulic pump detected by the pressure sensor, and determines that the hydraulic system is in the specific operation scene and the hydraulic pump is in the preset loaded state when the operation device is fully operated in the boom raising direction and the main relief valve is in the relief state.

4. The construction machine according to claim 1, wherein the controller is further configured to:

calculate the absorption torque of the hydraulic pump, calculate a pump load rate by dividing the absorption torque by a maximum absorption torque of the hydraulic pump, determine whether the pump load rate is equal to or higher than a preset load rate, and determine that the hydraulic pump is in the preset loaded state when the pump load rate is equal to or higher than the preset pump load rate.

5. The construction machine according to claim 4, wherein the controller is further configured to:

set a plurality of different values as the pump load rate and determine whether each of the pump load rates of the different values is equal to or higher than the preset pump load rate for the absorption torque, and enable the time history data of the feature variable to be displayed as the trend data for the engine diagnosis for each of the different pump load rates on the display device.

6. The construction machine according to claim 4, further comprising:

a load rate indicating device, wherein the controller is further configured to change the pump load rate in response to an indication of the load rate indicating device.

7. The construction machine according to claim 1, wherein the controller is further configured to:

smooth the controlled variable validated as the diagnosis data of the engine by performing filter processing on the controlled variable, and generate the time history data using the smoothed controlled variable as the current feature variable.

* * * * *